United States Patent
Zhang

(10) Patent No.: US 10,930,054 B2
(45) Date of Patent: Feb. 23, 2021

(54) METHOD AND SYSTEM OF ROBUST VIRTUAL VIEW GENERATION BETWEEN CAMERA VIEWS

(71) Applicant: INTEL CORPORATION, Santa Clara, CA (US)

(72) Inventor: Fan Zhang, San Mateo, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/445,066

(22) Filed: Jun. 18, 2019

(65) Prior Publication Data
US 2019/0304164 A1   Oct. 3, 2019

(51) Int. Cl.
| | |
|---|---|
| *G06T 15/08* | (2011.01) |
| *G06T 3/00* | (2006.01) |
| *G06T 5/00* | (2006.01) |
| *G06T 5/50* | (2006.01) |

(52) U.S. Cl.
CPC ............ *G06T 15/08* (2013.01); *G06T 3/0093* (2013.01); *G06T 5/005* (2013.01); *G06T 5/50* (2013.01); *G06T 2207/10012* (2013.01); *G06T 2207/20221* (2013.01); *G06T 2207/20228* (2013.01)

(58) Field of Classification Search
None
See application file for complete search history.

(56) References Cited

U.S. PATENT DOCUMENTS

| | | | |
|---|---|---|---|
| 2011/0148858 A1* | 6/2011 | Ni | H04N 13/111 345/419 |
| 2014/0063188 A1* | 3/2014 | Smirnov | H04N 13/122 348/43 |
| 2014/0078136 A1* | 3/2014 | Sohn | G06T 15/00 345/419 |
| 2017/0237971 A1* | 8/2017 | Pitts | H04N 5/2254 345/419 |
| 2017/0243373 A1* | 8/2017 | Bevensee | G03B 35/10 |

OTHER PUBLICATIONS

Zhang et al, 'Reliability Measurement of Disparity Estimates for Intermediate View Reconstruction', IEEE ICIP 2002, vol. 3, pp. 837-840. (Year: 2002).*
Sohl et al, 'Hierarchical Hole-Filling for Depth-Based View Synthesis in FTV and 3D Video', IEEE J. of Selected Topics in Signal Processing, 6(5), pp. 495-504, 2012. (Year: 2012).*
Kopf et al, 'Image-Based Rendering in the Gradient Domain', ACM Transactions on Graphics (Proceedings of SIGGRAPH Asia 2013), 32(6), 2013. (Year: 2013).*
Chaurasia, et al., "Depth synthesis and local warps for plausible image-based navigation", ACM Transactions on Graphics (TOG) 32.3, 2013.
Chaurasia, et al., "Silhouette-aware warping for image based rendering", Computer Graphics Forum, vol. 30, No. 4, Oxford, UK: Blackwell Publishing Ltd., 2011.

(Continued)

*Primary Examiner* — Patrick F Valdez
(74) *Attorney, Agent, or Firm* — Green, Howard & Mughal LLP.

(57) ABSTRACT

Techniques related to generating a virtual view of a scene from a position between positions of known input images for presentation to a viewer are discussed. Such techniques include applying gradient-based hole-filling interpolation.

24 Claims, 15 Drawing Sheets

(56) References Cited

OTHER PUBLICATIONS

Chen, S. et al., "View Interpolation for Image Synthesis", Proceedings of the 20th Annual Conference on Computer Graphics and Interactive Techniques, SIGGRAPH '93, Anaheim, CA, 1993.

Debevec, P. et al., "Modeling and rendering architecture from photographs: A hybrid geometry-and image-based approach", Proceedings of the 23rd annual conference on computer graphics and interactive techniques, ACM, 1996.

Facebook, "Surround 360", Retrieved online Jun. 10, 2019 via: https://github.com/facebook/Surround360.

Kopf, J. et al., "Image-based Rendering in Gradient Domain", ACM Trans Graph., vol. 32, No. 6, pp. 199:1-199:9, Nov. 2013.

McMillan, et al., "Plenoptic modeling: An image-based rendering system", Proceedings of the 22nd Annual Conference on Computer Graphics and Interactive Techniques, ACM, 1995.

Penner, et al., "Soft 3D reconstruction for view synthesis", ACM Transactions on Graphics (TOG); vol. 36, No. 6, 2017.

Perez, et al., "Poisson Image Editing", Microsoft Research UK, ACM Transactions on Graphics; vol. 22, No. 3, pp. 313-318, 2003.

\* cited by examiner

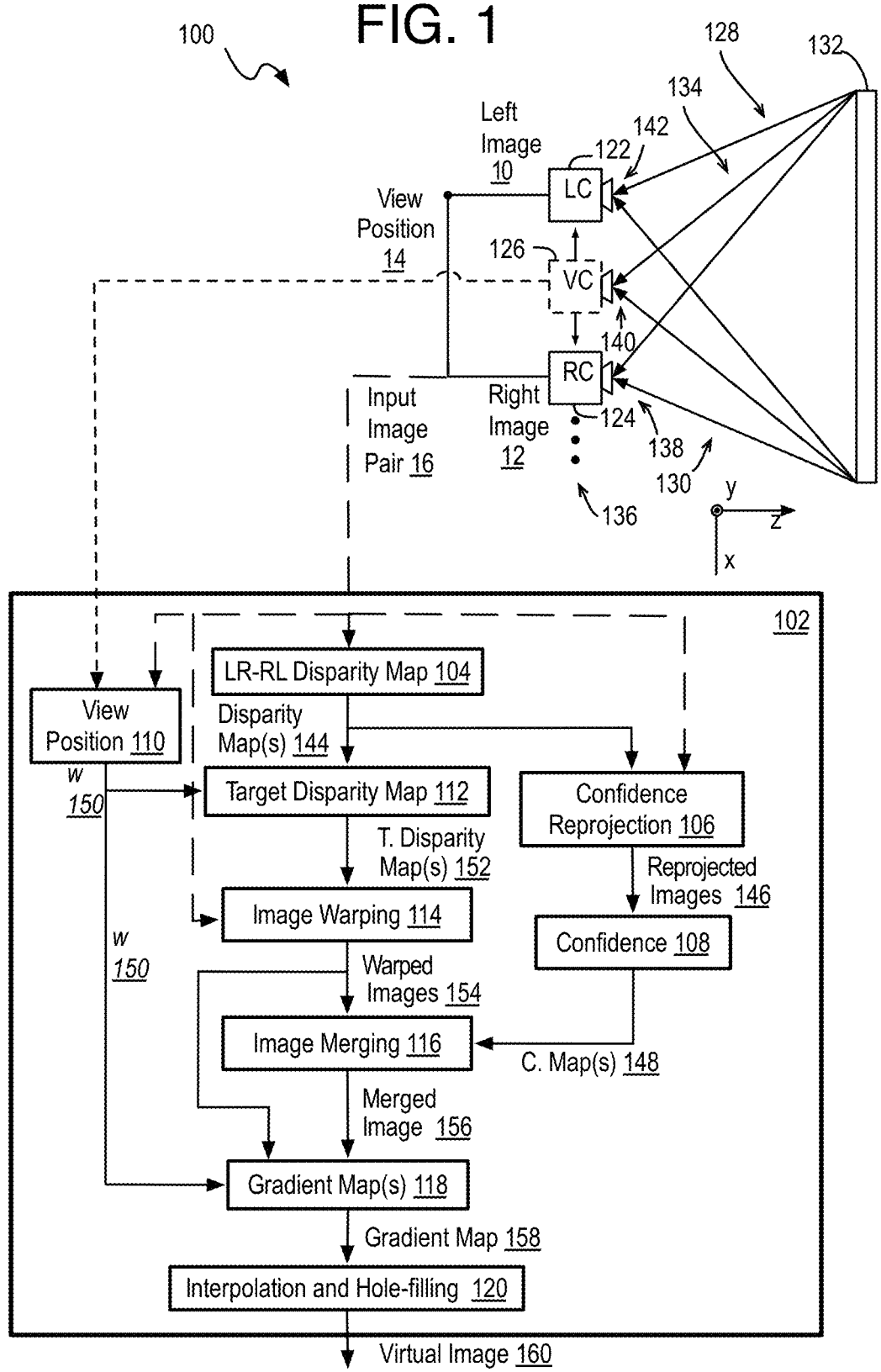

OBTAIN IMAGE DATA OF FIRST AND SECOND INPUT IMAGES, RESPECTIVELY CORRESPONDING TO FIRST AND SECOND VIEW POSITIONS OF THE SAME SCENE
202

GENERATE A MERGED IMAGE OF A TARGET VIRTUAL VIEW BETWEEN THE FIRST AND SECOND VIEW POSITIONS AND BY MERGING WARPED IMAGES ASSOCIATED WITH THE FIRST AND SECOND INPUT IMAGES
204

FILL HOLES ON A VIRTUAL VIEW IMAGE AT THE TARGET VIRTUAL VIEW GENERATED BY USING THE MERGED IMAGE AND COMPRISING SOLVING AN ENERGY EQUATION THAT COMPARES

(1) A DIFFERENCE BETWEEN A FINAL INTERPOLATED CURRENT PIXEL VALUE AND A FINAL INTERPOLATED NEIGHBOR PIXEL VALUE THAT ARE BOTH UNKNOWNS IN THE EQUATION AND (2) A GRADIENT GENERATED BY USING IMAGE VALUES OF THE WARPED IMAGES AND AT LEAST ONE INTERPOLATION WEIGHT WHEN NO IMAGE DATA EXISTS AT A CURRENT PIXEL LOCATION ON THE MERGED IMAGE AND CORRESPONDING TO THE FINAL INTERPOLATED CURRENT PIXEL VALUE BEING COMPUTED
206

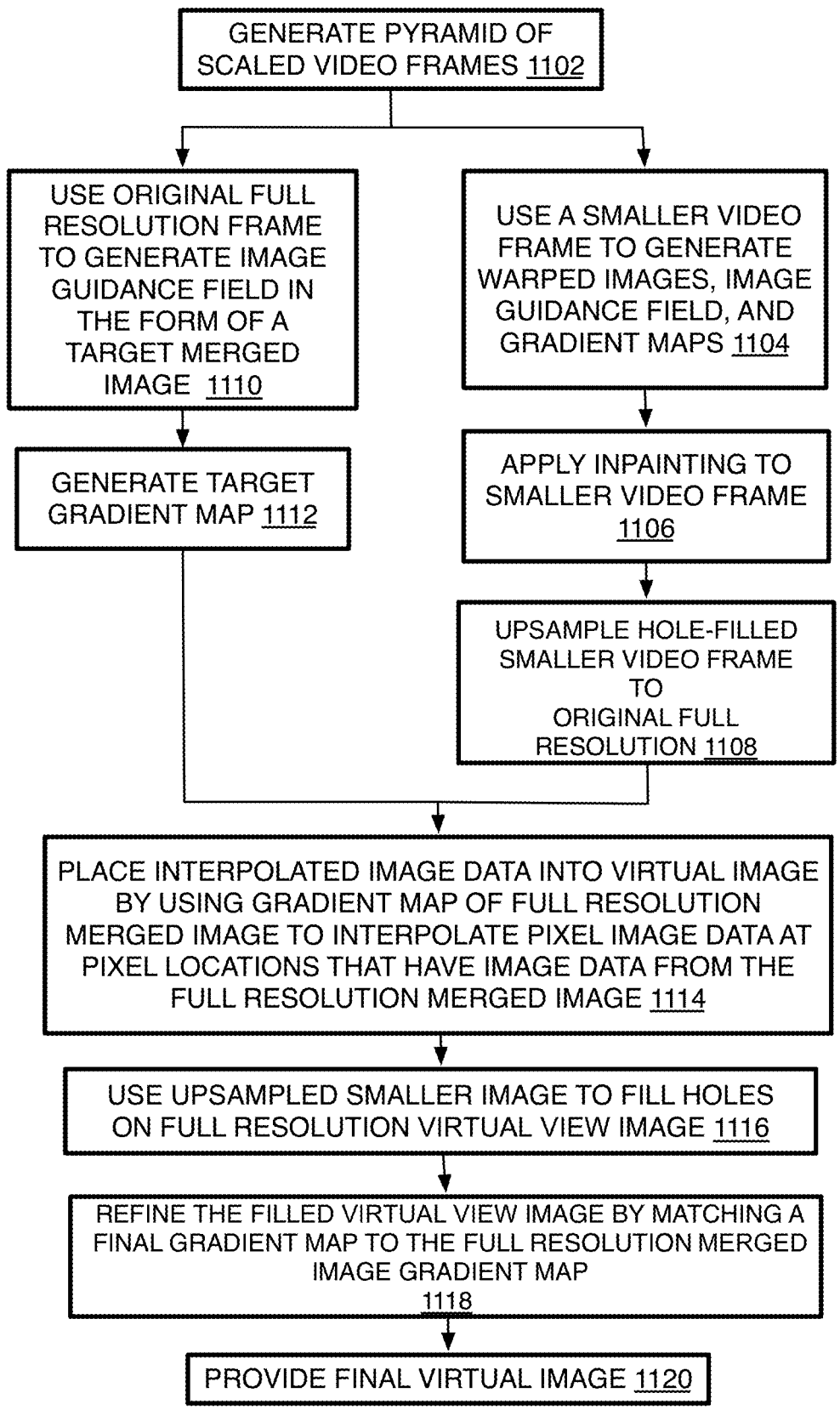

FIG. 12A   FIG. 12B   FIG. 12C   FIG. 12D
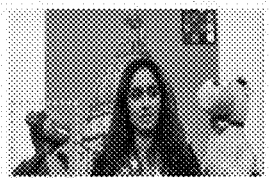 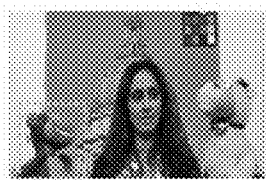 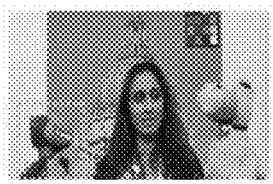 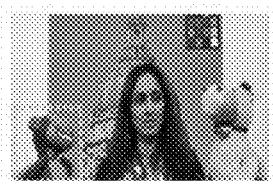
1200        1202        1204        1206
FIG. 12A-1  FIG. 12B-1  FIG. 12C-1  FIG. 12D-1
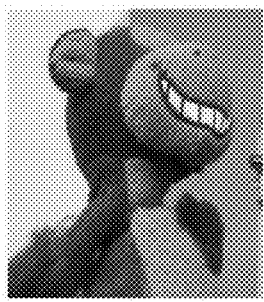 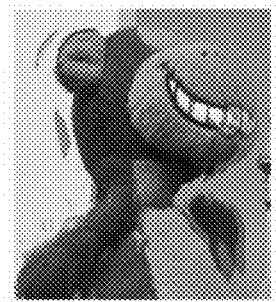 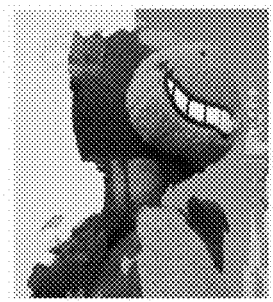 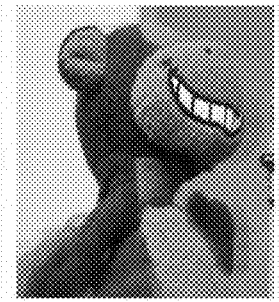
1208        1210        1212        1214

1300

1302

1304

1306

1308

1310

1312

1314

1316

1318

1320

1400

1402

1404

1406

1408

1410

1412

1414

1416

1418

1420

METHOD AND SYSTEM OF ROBUST VIRTUAL VIEW GENERATION BETWEEN CAMERA VIEWS

BACKGROUND

Camera arrays such as two or more aligned cameras are becoming increasingly common in a variety of device implementations such as tablets, smartphones, laptops, display devices, telepresence systems, filmmaking and video production systems, and so forth. In the context of a viewing experience generated by such camera arrays, intermediate virtual views between camera locations are generated and provided to a user for display.

It is an ongoing goal to render realistic virtual images at positions between captured camera views efficiently and with minimal visual artifacts. Current techniques for rendering virtual views from multiple camera images include volumetric 3D reconstruction of a scene from the images and using 3D graphics rendering techniques to render virtual views. However, 3D reconstruction is computationally expensive and error prone, resulting in visual artifacts in the rendered image. Image-based rendering (IBR) techniques avoid explicit reconstruction of the 3D geometry and instead render the virtual view directly from captured images. For example, IBR interpolation may use two images and their pixel correspondence maps to warp the images to a desired position. The IBR techniques, however, often have noisy disparity maps and large camera parallax (or offsets or viewing angle) between the camera views resulting in significant undesirable visible image artifacts. Also, those IBR techniques that provide better accuracy often have large computational loads that prevent real-time operation of synthesized or virtual view generation during video sequence rendering.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 illustrates an example device for generating a virtual view of a scene;

FIG. 2 is a flow chart of a method of robust virtual view generation between camera views according to at least one of the implementations herein;

FIG. 11 is a flow chart of an example method of accelerating robust virtual view generation between camera views according to at least one of the implementations herein;

FIGS. 12A to 12D-1 are first scene images showing experimental results of the disclosed virtual view generation method and three other conventional methods;

FIGS. 13D to 13G-1 are second scene images showing experimental results of the disclosed virtual view generation method and three other conventional methods;

FIGS. 14D to 14G-1 are third scene images showing experimental results of the disclosed virtual view generation method and three other conventional methods;

DETAILED DESCRIPTION

Figure 3:
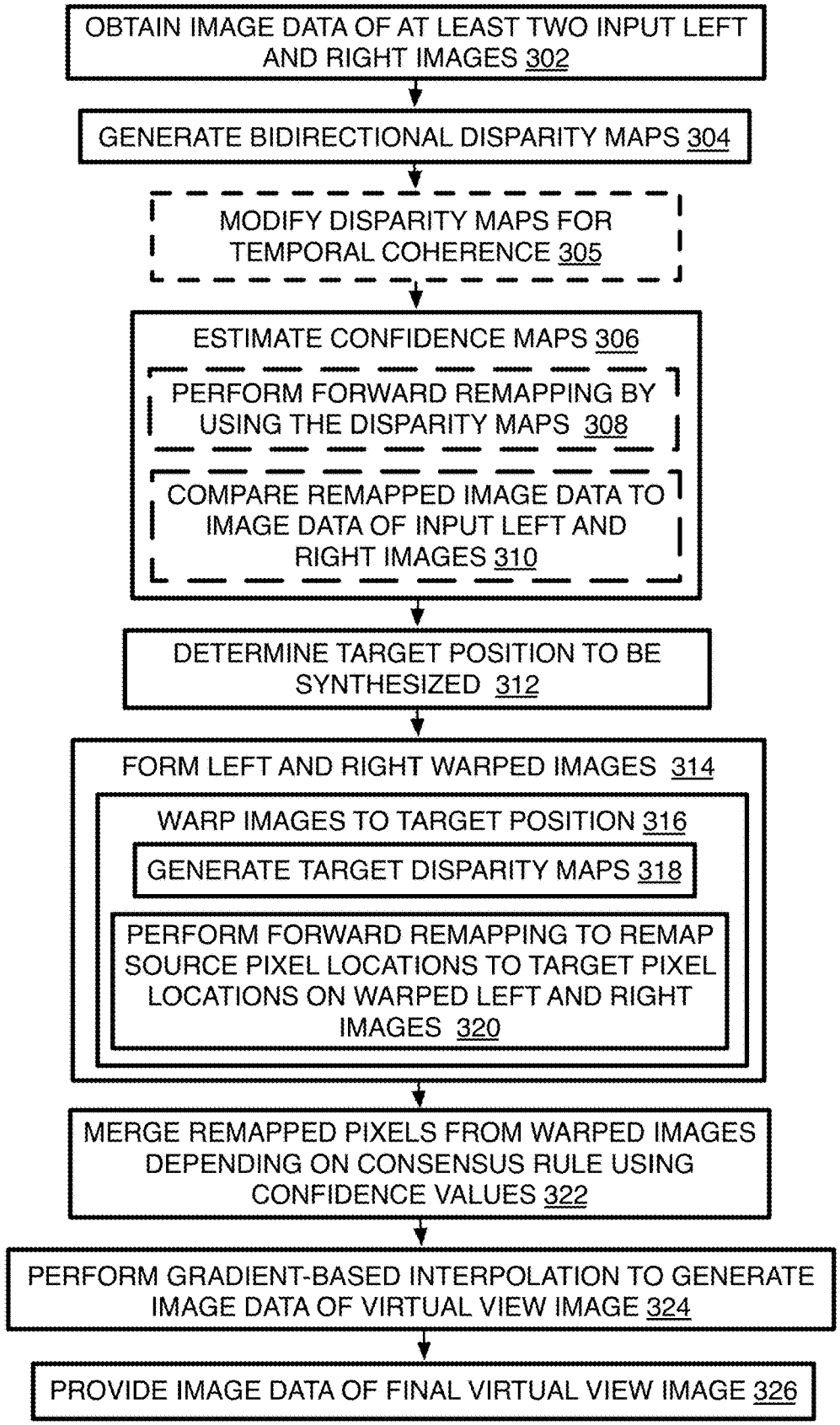
FIG. 3 is a detailed flow chart of a method of robust virtual view generation between camera views according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, tablets, camera arrays, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, computing platforms, and articles are described herein related to robust virtual view generation between camera views.

As described above, it is desirable to generate virtual or synthetic (or target) images that are images of a scene formed from a location or viewpoint that is between two real camera views or locations. High quality virtual images provided in real time are often desired for immersive experiences such as with virtual reality (VR) systems for example where the VR images should be shown in real time.

A virtual image may be formed by using the two images from two cameras spaced from each other at a parallax where two images have a difference of field of view (FOV). Interpolating in-between or intermediate views for images and videos with a large parallax, at least about 100 pixels for example, often results in a target (or virtual or synthetic) image of poor quality. Some existing interpolation techniques usually need to estimate a proxy geometry either by generating accurate depth maps or reconstructing 3D scenes and then use them as the guidance to perform interpolation tasks. However, accurate proxy geometry estimation algorithms such as optical flow that tracks motion or 3D reconstruction are very time-consuming so that often real-time operation cannot be performed. Alternatively, stereo matching based methods, which also use a proxy geometry, can estimate disparity efficiently but usually generate very noisy and inaccurate results for images and/or video with large parallax. Reliance on such inaccurate proxy geometry estimation may result in unacceptable artifacts in the synthesized view.

Otherwise, advanced techniques use more sophisticated processes such as silhouette warping, sparse 3D reconstruction, super-pixel warping, and/or gradient shifting to generate a remapped view, which is then further refined with optimization methods. These advanced techniques such as the warping and sparse 3D reconstruction need to sparsely reconstruct the scene which is extremely time-consuming. The gradient-shifting methods only work on rectified images before reprojecting the interpolated image back to the original positions, which adds on significant computational load and time consumption. Soft 3D reconstruction techniques build volumetric content for input images and synthesize novel views based on ray tracing. These volumetric reconstruction techniques, however, are both time-consuming and memory-intensive as well.

To resolve these issues, techniques discussed herein render realistic virtual view images at positions between captured camera views efficiently, fully automatically, and with no or minimal visual artifacts. To accomplish this, an efficient video interpolation method disclosed herein interpolates in-between views for images and videos with large parallax, where two images may have a difference of field of view (FOV) at least about 100 pixels, and while still remaining robust with using inaccurate estimated disparity maps. It should be noted that the term "virtual view" may refer to the view itself and a position separate from an image, or may refer to an image at the position of a virtual view depending on the context. Thus, the phrase forming or generating a virtual view generally would refer to generating an image of pixel image data at the position of a virtual view for example.

In more detail, the method disclosed herein takes as input two images (referred to as left and right images) which can have large parallax, and then estimates left-to-right (LR) and right-to-left (RL) disparity maps. These initial RL-LR disparity maps, or single bidirectional disparity map, are then used to form pixel-level confidence values that indicate the similarity between, on the one hand, the left and right images reprojected by using the initial disparity maps, and on the other hand, the original left and right input images. This indicates the accuracy of the disparity maps for a single pixel location. The initial disparity maps also are used to form target disparity maps between the input images and a target image or virtual view. This is performed by applying an interpolation ratio or weight to the initial disparity maps. Then, the target disparity maps are used to form left and right warped images at the target or virtual view position. Next, both the confidence values and the warped images are then used to generate an image guidance field that is in the form of a merged image and by using image data only of sufficiently high confidence disparity values. This is referred to as remapping or warping of the original left and right input images.

Due to occlusions and inaccurate disparity estimation, the current interpolated view or merged image still will have regions (or holes or occlusions) without any RGB image data filling the holes. Instead of using heuristic rules to fill those regions and then refine them, the disclosed method treats the hole filling as an inpainting problem and directly fills the holes while generating a final interpolated view using a Poisson-gradient-based image editing method. It should be noted that, herein, a hole generally refers to any size or shape region of an image that is missing image data.

Poisson image editing, or gradient-domain image processing, uses the differences or gradients of chroma and/or luminance image data between a current pixel and its neighboring pixels, rather than the original pixel value from the original left or right image directly in an interpolation and hole-filling energy equation that generates an interpolated image value for the target or virtual view image. For example, see Pérez, P., et al., *Poisson image editing*, ACM Transactions on graphics (TOG) 22.3, 313-318 (2003). Mathematically speaking, an image gradient may represent a derivative of an image. Thus, a new image, or part of an image, may be constructed by integrating the gradient, which may be solved by using Poisson's equation. Generally, the process may include generating gradient values, and then the Poisson's equation is solved by finding image data that approximates the desired gradient as close as possible. This is performed by solving the Poisson equation, which is solved by minimizing an energy equation with a gradient energy (or smoothing) term that differences the final image value and final neighbor image values from the gradients using an iterative algorithm such as a conjugate gradient solver. The gradients are preserved by minimizing a $L^2$ error (mean square) with the energy equation.

The gradient values used in the gradient energy term can be gradients computed by using the image guidance field data (or merged image) when such image data is present. When the merged image is missing image data at pixels in the merged image, then disparity guided reprojected gradient values are used to fill holes a virtual view image being constructed and the gradients from the disparity guided gradients are preserved instead. These disparity guided reprojected gradient values are computed by using the interpolation weights used to form the target disparity maps and the image values from the warped left and right images before the images were merged to form the merged image of the image guidance field.

In order to ensure greater accuracy, the result of the gradient energy term also is adjusted by using a historical constraint term (or data energy term) that can modify the result of the gradient energy term.

Once the energy equation is minimized, the result is an interpolated image pixel value for a single pixel location, and this may be repeated for each or individual pixel locations on the merged image. Other details are provided below.

Also, motion from frame to frame can cause noticeable artifacts such as uttering and flickering due to independently interpolating each video frame. Thus, to generate synthesized video results with temporally consistent content, the disclosed method also incorporates temporal coherence handling into the view interpolation pipeline. This may involve downsampling the input image data to generate motion maps between consecutive frames, and then using RL or LR disparity map values of the previous left and right input images, such as in a video sequence, rather than the disparity values generated for the current left and right input images depending on whether the value of the motion map meets a motion criterion such as a threshold.

Furthermore, in order to ensure that the present method can be operated in real time to provide good quality rendering of video, an acceleration technique is applied that applies the Poisson-gradient-based energy equation on a downsampled form of the merged image (or image guidance field) that itself is formed from downsampled versions of the left and right input images. The resulting filled, downsampled virtual view image is then upsampled to the full original resolution. The data from the upsampled image is then used to fill holes on a full-size virtual view image generated by using the full resolution-sized merged image, which in turn is based on full resolution left and right input images. The full-size filled virtual view image is then refined by matching a gradient map of the virtual view image to the full resolution gradient map of the full resolution image guidance field (merged image).

This method can take very noisy and inaccurate disparity maps as input and generate satisfactory interpolation results in real time. It also can effectively interpolate satisfactory results from views with a large amount of parallax. Thus, 3D reconstruction, camera calibration, and image rectification may be completely avoided. With the use of a graphics processing unit (GPU) acceleration, the present method can easily run in real time.

Figure 13A:
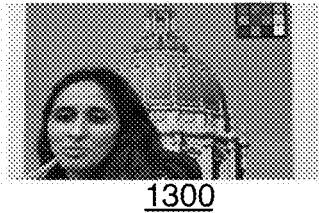
FIGS. 13A-13B are input images of a second scene for another experiment.
Figure 13B:
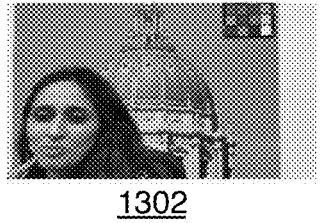
Figure 13C:
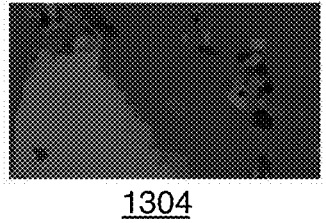
FIG. 13C is a disparity map for the input images of the second scene.
Figure 13D:
Figure 13E:
Figure 13F:
Figure 13G:
Figures 1, 13D:
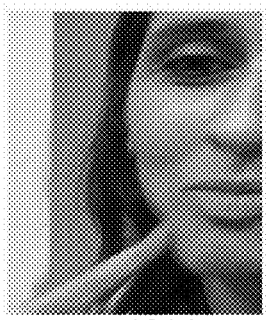
Figures 1, 13E:
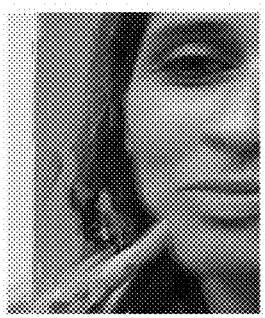
Figures 1, 13F:
Figures 1, 13G:
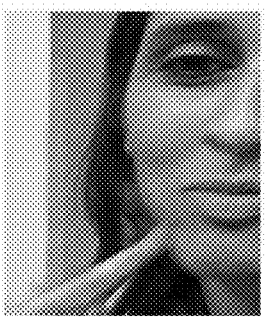
Figure 14A:
FIGS. 14A-14B are input images of a third scene for another experiment.
Figure 14B:
Figure 14C:
FIG. 14C is a disparity map for the input images of the third scene.
Figure 14D:
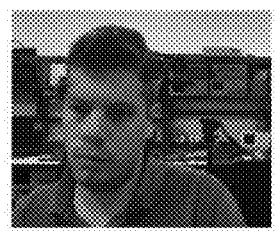
Figure 14E:
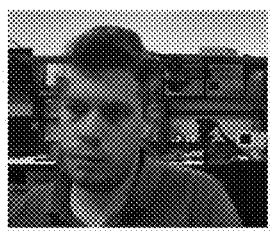
Figure 14F:
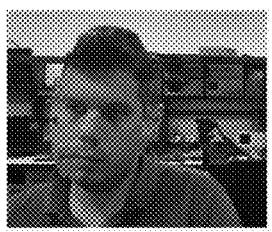
Figure 14G:
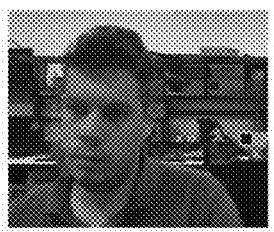
Figures 1, 14D:
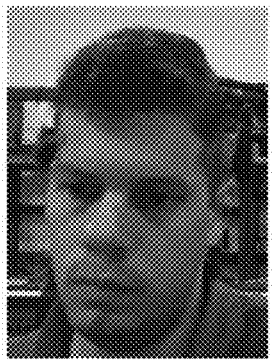
Figures 1, 14E:
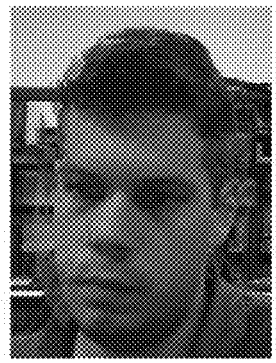
Figures 1, 14F:
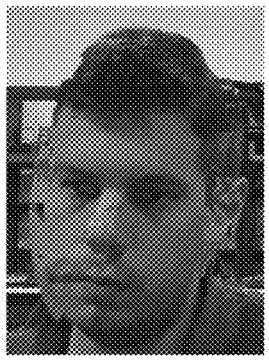
Figures 1, 14G:
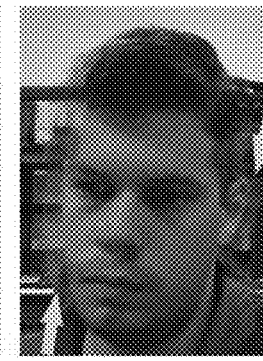
Figure 15A:
FIGS. 15A-15B are input images of a fourth scene for another experiment.
Figure 15B:
Figure 16:
FIG. 16 is an image of optical flow for the fourth scene.
Figure 17:
FIG. 17 is a refined final virtual image of the fourth scene using at least one of the implementations herein.

Referring now to FIG. 1, an image processing device 100 may be provided to render virtual views from a finite sampling of a scene attained using a moving camera, a camera array, whether a planar array or not, or two or more camera devices. The device 100 may generate high quality and efficiently generated virtual views for positions between camera positions. Such multi-view devices and notably, camera arrays, are becoming increasingly common in numerous visual applications including virtual navigation of a scene such as outside-in rendering from multiple views of an object (e.g., volume rendering), generation of stereoscopic panoramas from circular configurations of camera arrays (e.g., inside-out rendering for VR), interactive multi-view video applications (e.g., teleconferencing), etc. The techniques discussed herein may be used in any context where a virtual image is to be generated for a view position that is between the view positions of at least two known input images. The input images may be attained in any suitable manners such as image capture via cameras, image or graphics rendering, or such input images may be received from memory or another device for processing. The disclosed techniques provide efficient, image-based rendering of virtual views. Such techniques eliminate or minimize visual artifacts and may be implemented in real-time on current hardware platforms.

Specifically, example image processing device 100 is provided for generating a virtual view of a scene, arranged in accordance with at least some implementations of the present disclosure. Device 100 includes a synthesized image forming unit 102 that may be operated by one or more image signal processors (ISPs) or graphics processing units (GPUs). The synthesized image forming unit 102 implements one or more of a left-to-right and right-to-left (LR-RL) disparity map unit 104, a confidence reprojection unit 106, a confidence unit 108, a view position unit 110, a target disparity map unit 112, an image warping unit 114, an image merging unit (or image guidance field unit) 116, a gradient map(s) unit 118, and an interpolation and hole-filling unit 120. Device 100 also may include, use, or receive image data from, a left camera 122, and a right camera 124. Device 100 may be implemented in any suitable form factor device such as a personal computer, a laptop computer, a tablet, a phablet, a smart phone, a digital camera, a gaming console, a wearable device such as virtual reality (VR) head mounted displays (HDMs), a display device, an all-in-one device, a two-in-one device, or the like. For example, device 100 may perform virtual view rendering or interpolation as discussed herein. In some implementations, in addition or in the alternative to left camera 122 and right camera 124, device 100 may attain multi-view images for virtual view interpolation from a camera array, a memory, another device, a rendering engine, and so forth. For example, the components of device 100 may be incorporated into any multi-camera consumer or commercial electronic device to deliver immersive visual experiences, in commercial telepresence systems featuring multiple cameras, or in virtual reality (VR) systems, and so forth.

As shown, left camera 122 receives incoming light 128 from a scene 132. Left camera 122, based on exposure to incoming light 128, generates left image 10. Similarly, right camera 124 receives incoming light 130 from scene 132 and, based on exposure to incoming light 130, generates right image 12. Left camera 122 and right camera 124 may be any suitable imaging device such as RGB cameras, or the like. In some implementations, device 100 receives left image 10 and right image 12 from another device via a communications channel (not shown). In some implementations, left image 10 and right image 12 are attained for processing from a memory (not shown) of device 100. Left image 10 and right image 12 may include any suitable image data, picture data, video frame data, or the like or any data structure representative of a picture at any suitable resolution. In an implementation, left image 10 and right image 12 are full images of RGB image data each having R (red), G (green), and B (blue) chroma values for pixels thereof. When images are being discussed herein, each color may have a separate channel (or image) that may be handled separately so, for example, the processes herein may apply to an image or channel of the red values separately, and similarly with the green values and the blue values, even though such chroma data separation may not be mentioned while describing operations with an image. The resulting pixel values of the separate color channels are then combined to form a single full virtual image. In an implementation, left image 10 and right image 12 have a resolution of 1920×1080 pixels.

Although illustrated and discussed herein with respect to left and right cameras 122, 124 and left and right images 10, 12, the techniques discussed herein may be implemented for any suitable arrangement of cameras and images. In some implementations, cameras may be arranged above and below one another and/or images may be top and bottom images. Thus, the left and right images are labeled this way merely for differentiation and are included in first and second images discussed herein. Furthermore, device 100 is illustrated with two cameras—left and right cameras 122, 124—for the sake of clarity of presentation. However, device 100 may include any number of cameras to generate a camera array 136 with such cameras spaced out in the x-direction (to provide a horizontal camera array), the y-direction (to provide a vertical camera array), or both (to provide a camera grid) to generate any number of images. Any of such images may be paired and an intermediate image may be determined for the image pair. Thereby, any number of intermediate images may be generated. Furthermore, more than one virtual image between such image pairs may be generated. For example, one virtual image may be formed as if at a position halfway (or any other position) between the image pair, or multiple virtual images may be formed as if at different positions between the image pair. Herein, without loss of generality, the images of such image pairs are typically labeled first and second or left and right images and an image interpolated therebetween is labeled as any of a target, virtual, synthesized, or intermediate image.

As shown, image signal processor 102 receives left and right input images 10, 12 as an input image pair 16 as well as a selected view position 16 corresponding to a virtual camera 126 that illustrates a desired view of scene 132. Notably, device 100 may generate a final virtual image 160 of scene 132 as if from view (or virtual view) position 140, which may be at any position between view position 142 of left camera 122 and view position 138 of right camera 124. Selected view position 140 may be generated using any suitable technique or techniques such as detection of a position of a user of device 100, reception as input from a user or a controller, and so forth. The details for the operation of the image processing device 100 are provided below with processes 200, 300, 700, 1000, and 1100 respectively of FIGS. 2, 3, 7, 10, and 11.

Referring to FIG. 2, an example process 200 for generating a virtual view of a scene, arranged in accordance with at least some implementations of the present disclosure, may include one or more operations 202-206, generally numbered evenly. By way of non-limiting example, process 200 may form at least part of a virtual view generation process as performed by device 100 (FIG. 1) as discussed herein. Furthermore, process 200 may be described herein with reference to system 1800 of FIG. 18.

Process 200 may include "obtain image data of first and second input images, respectively corresponding to first and second view positions of the same scene" 202, and as mentioned, from a camera array of at least two cameras. The images may be part of a video sequence where pairs, or other number, of images are provided, and a pair of images from the same time instance are used to form a virtual view when the scene is moving. Otherwise, when the scene is not moving, two images from the same moving camera but at different angles or fields of view relative to the scene may form the image pair. This operation also may include any pre-processing necessary to convert raw image data from the cameras into image data that can be used for the virtual view generation such as conversion between YUV and RGB color space when needed. Thus, the pre-processing may or may not involve rectifying the images.

Process 200 may include "generate a merged image of a target virtual view between the first and second view positions and by merging warped images associated with the first and second input images" 204. As described in detail below, generating a merged image may involve obtaining initial disparity maps that indicate the differences between the first and second images such as the LR-RL (or bilateral) disparity maps described herein. The initial disparity maps may be used to generate reprojected first and second images. The reprojected images are then compared to the first and second input images to provide pixel-level confidence values that indicate the accuracy of the disparity maps at a pixel location, and particularly indicate whether a change in image data at a same pixel location from input image to reprojected image meets a criterion such as a threshold. If the difference is too large at a pixel location, confidence in the disparity maps is considered low, and the resulting image data at that location will not be used.

Separately, the initial disparity maps also are used to generate the image data of warped images that, in turn, are merged to form the merged image. So, for instance, the position 140 of the desired virtual view relative to known camera positions 138 and 142 is obtained, whether set automatically or from a user selection as described herein. The distance from the left or right camera view to the virtual view position over the distance between the left and right camera views is an interpolation ratio or weight (or simply considered the virtual view position). The interpolation weight is shown as w on device 100 and the equations recited below. The interpolation weight and the initial disparity maps are then used to form target disparity maps that indicate the movement of pixel locations from either the first or second input image to the virtual view image. Thereafter, the target disparity maps and the first and second input images are used to form first and second warped images respectively.

The warped images are then merged into an image guidance field in the form of a merged image by using the confidence values where pixel locations on the merged image with low confidence are not given image data and are considered a hole on the merged image.

Process 200 may include "fill holes on a virtual view image at the target virtual view generated by using the merged image and comprising solving an energy equation that compares (1) a difference between a final interpolated current pixel value and a final interpolated neighbor pixel value that are both unknowns in the equation and (2) a gradient generated by using image values of the warped images and at least one interpolation weight when no image data exists at a current pixel location on the merged image and corresponding to the final interpolated current pixel value being computed" 206. This refers to a gradient-based interpolation equation described in detail below, and that also may be a Poisson image editing equation. Thus, the input image pixel value is not used in the interpolation equation itself.

Specifically, the energy equation has a gradient energy term and a data energy term that preserve the gradients by performing minimization of the $L^2$ error of the energy equation. The gradient value between the current pixel (or pixel location) being analyzed and neighbor pixels (such as the upper, lower, left, and right pixel locations) in the equation is determined differently depending on whether image data exists for at least the current pixel location on the merged image. When no image data is at the current pixel location on the merged image (or at one of the neighbor pixel locations by one example), corresponding image data of the warped images are used along with the interpolation weight used to form the target disparity maps. This may be considered the gradient map of disparity guided reprojected gradient values. When image data is at the current pixel location on the merged image (or image guidance field) and at a neighbor pixel location, then known gradient algorithms may be used to form a gradient map for the merged image, and the gradient values are taken from the gradient map of the merged image (or image guidance field). Once the energy equation is minimized, the result is a final interpolated pixel value for the current pixel location, which may be repeated for each or individual pixel locations thereby forming a final virtual image. Note that final here is relative to the operations described herein and does not include any other post-processing or refinement of the virtual image which may occur subsequent to the operations described herein. More details are provided below.

Also as mentioned, temporal coherence may be maintained by generating motion maps for the first and second input images indicating motion of image data from one frame to a next frame along a video sequence where one of the frames is the first or second input image. The initial disparity maps then may be modified depending on the motion maps before use of the initial disparity maps, thereby increasing quality and removing motion related artifacts. By one form, when a sufficiently small amount of motion occurs, then the difference value from the prior initial disparity map is used, but when a relatively large amount of motion is detected, then the difference value on a current initial disparity map is a combination of the values from the initial disparity map before modification and the prior disparity map, such as an average for example. Other details are provided below.

As another option, the virtual view generation can be accelerated. This may involve generating a full resolution merged image by using full resolution versions of the first and second input images and a scaled down merged image by using downscaled first and second input images. Then the full resolution merged image is used to generate a full resolution virtual view image, and the downscaled merged image is used to form a downscaled virtual view image. The holes on the downscaled virtual view image are filled by the operations described above, and then the system uses the data of the hole-filled downscaled virtual view image to fill holes on the full resolution virtual view image. This significantly reduces the number of computations performed pixel-by-pixel for solving the interpolation and hole filling energy equation.

Referring to FIG. 3, an example process 300 for generating a virtual view of a scene, arranged in accordance with at least some implementations of the present disclosure, may include one or more operations 302-326, generally numbered evenly. By way of non-limiting example, process 300 may form at least part of a virtual view generation process as performed by device 100 as discussed herein. Furthermore, process 300 may be described herein with reference to system 1800 of FIG. 18.

Process 300 may include "obtain image data of at least two input left and right images" 302, and already as described above with operation 202. This may refer to left and right images 10, 12 forming input image pair 16 (FIG. 1) and are from a video sequence where each pair of images are analyzed and analysis of a prior image may be used for the current analysis. The images may or may not be rectified images. The input left and right images may have a very large parallax such as more than 100 pixels while the maximum parallax only may be limited by the depth range of a scene and camera baseline location. Example left and right input images 400 and 450 are provided on FIGS. 4A and 4B.

Process 300 may include "generate bidirectional disparity maps" 304, and as described above, this refers to the LR-RL or initial disparity maps for the input images, and may be generated by a LR-RL disparity map unit 104. The disparity maps 144 may be generated by conventional techniques such as block matching between left and right images 10, 12, optical flow techniques, IR sensing techniques, and so forth. Thus, a disparity map or correspondence map is a grid of statistics for the left and right images. For the left image, a left-to-right (LR) disparity map is generated that indicates a change or difference in pixel location for the same image content from the left image pixel location and to the right image pixel location. The disparity map tracks the change in location of grayscale values (such as the luminance in YUV color space) or RGB color pixel image data values for example. Thus, the disparity map at a left image pixel location has the horizontal and/or vertical differences in pixel coordinates to compute the corresponding pixel location in the right image. The opposite is true for the right image and a right-to-left (RL) disparity map. By one example, one disparity map is formed for horizontal changes and another disparity map is formed for vertical changes.

Both left and right disparity maps are needed because the left and right disparity maps do not necessarily indicate the same disparity for a corresponding pair of pixels from the two images depending on the algorithm used. By one form, a single pair of disparity maps is provided in grayscale, but alternatively the disparity maps could be provided for each of the three RGB color channels instead so that each color channel has its own two pair of disparity maps (left-to-right horizontal and vertical disparity maps and right-to-left horizontal and vertical disparity maps). By another form, each channel has one disparity map for each input image pair.

Figure 5:
FIG. 5 illustrates an example disparity map between left and right images.

Referring to FIG. 5, an example left-to-right disparity map 500 is shown between left and right images 10, 12, arranged in accordance with at least some implementations of the present disclosure. The disparity map may include disparity values such that pixels with low disparity are indicated as lighter and pixels with larger disparity are indicated as darker. In other implementations, only a single correspondence map (e.g., disparity map) is used.

Figure 10:
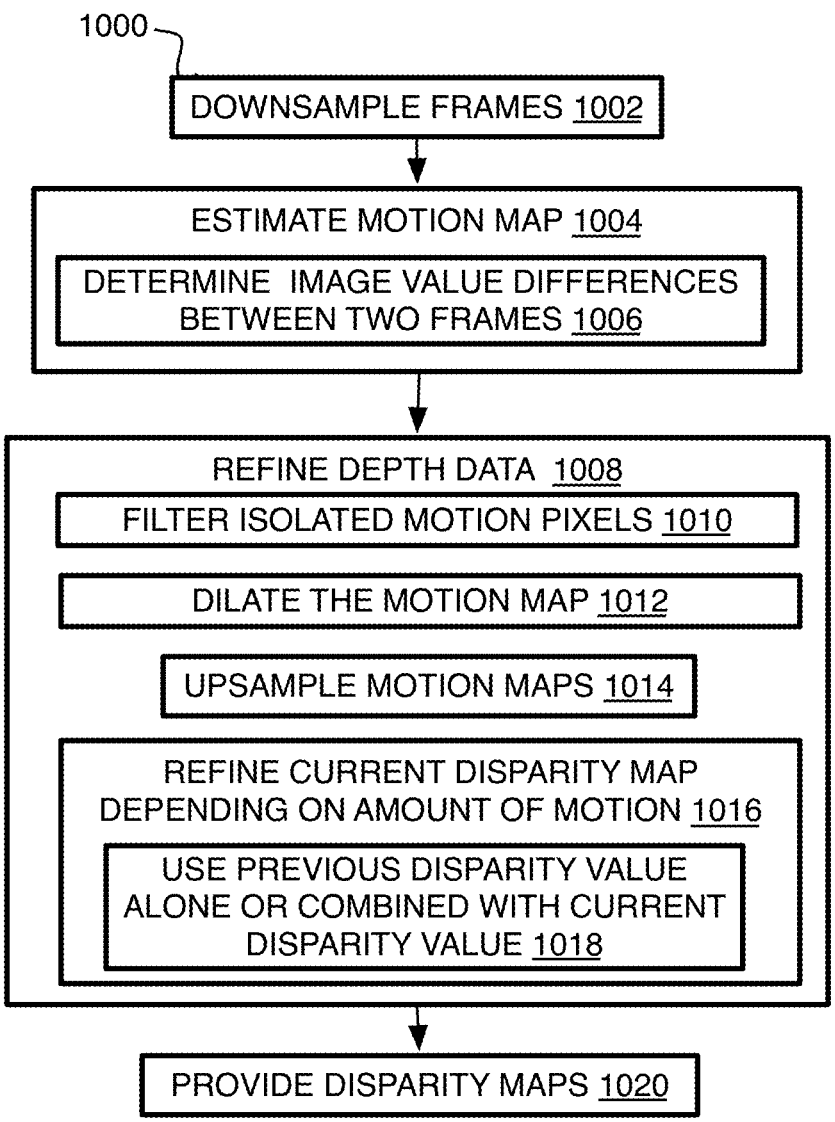
FIG. 10 is a flow chart of an example method of maintaining temporal coherence to perform robust virtual view generation between camera views according to at least one of the implementations herein.

Optionally, process 300 may include "modify disparity maps for temporal coherence" 305, and this process is described below with process 1000 (FIG. 10). Generally, the input images may be downsampled to form the disparity map, and motion maps from frame to frame along a video sequence may be generated. The initial disparity maps then may be modified depending on the amount of motion from the previous frame to avoid motion-causing artifacts. The details are provided below.

Process 300 may include "estimate confidence maps" 306. This first includes "perform forward remapping by using the disparity maps" 308. For this operation, the confidence reprojection unit 106 reprojects the initial left and right input images to form confidence reprojections (or reprojected or remapped images). Specifically, forward remapping is used to reproject the left image according to the left-to-right disparity to obtain a left reprojected image. Likewise, the right image is reprojected according to the right-to-left disparity to get a right reprojected image. The following performs the remapping:

$$\overline{I}_r(i+f_{l \rightarrow r}{}^h(i,j), j+f_{l \rightarrow r}{}^v(i,j)) = I_l(i,j) \quad (1)$$

$$\overline{I}_l(i+f_{r \rightarrow l}{}^h(i,j), j+f_{r \rightarrow l}{}^v(i,j)) = I_r(i,j) \quad (2)$$

where (i, j) refers to horizontal (or column) and vertical (or row) pixel coordinates on an image and corresponding to the same pixel location on a disparity map, $I_l$ is the input left image, $I_r$ is the input right image, $\overline{I}_l$ is the resulting left reprojected image that matches with the right image and $\overline{I}_r$ is the resulting right reprojected image that matches with the left image.

Figure 6:
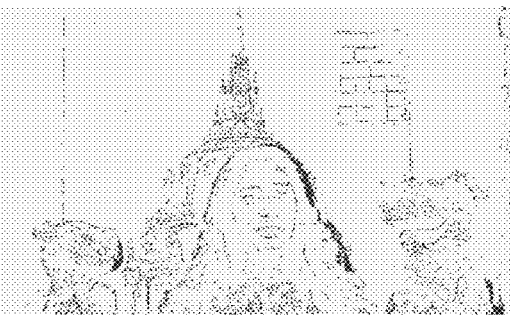
FIG. 6 illustrates an example confidence map according to at least one of the implementations herein.

Next, process 300 may include "compare remapped image data to image data of input left and right images" 310, and this may be performed by the confidence unit 108. Thus, once the left and right reprojected images are formed, confidence values are generated by using the RGB value differences between the left and right reprojected images that are based on the LR-RL disparity maps and the initial left and right input images. Any disparity value that results in a RGB difference between the reprojected and initial images at the same pixel location that is greater than a predetermined threshold thr indicates the disparity from left to right does not match the disparity from right to left and therefore a significant inaccuracy exists on the disparity map. This is considered a poor estimation and the image data for this pixel location will not be used. In this case, the confidence value may be set to 0 or other value that indicates poor estimation or low confidence. Otherwise, the confidence value is set to 1 (or other desirable value) when the difference is less than the threshold, which indicates a good estimation and establishes high confidence. An example confidence value is determined for the left reprojected image, and is the same computation for the right reprojected image, as follows:

$$c_l(i,j) = \begin{cases} 0, & \text{if } \text{abs}(\overline{I}_l(i,j) - I_l(i,j)) > thr \\ 1, & \text{if } \text{abs}(\overline{I}_l(i,j) - I_l(i,j)) < thr \end{cases} \quad (3)$$

where thr may be a threshold determined by experimentation. An example confidence map 600 (FIG. 6) for the input images 400- and 450, and LR disparity map 500 is shown and representing the 0 or 1 confidence values at each pixel location where high confidence is shown by the dark lines and the remainder has low confidence. Alternatively, a range of confidence values could be from zero to one inclusive rather than the binary decision here.

Separate from the confidence value generation, the LR-RL initial disparity maps 144 may be used to generate target disparity maps 152 that indicate the difference of pixel location for image data from the left and right input images respectively to left and right target images at a virtual view position, and to eventually provide left and right warped images 154 at the virtual view position 14. Preliminarily, this first may involve "determine target position to be synthesized" 312, and may be performed by the view position unit 110 that receives data of the position 14 of the virtual view. The virtual view position may be automatically fixed at certain intervals between the left and right view positions of the left and right cameras 122 and 124. By other forms, the virtual view position is set automatically by image or display applications. By yet other forms, a user selects the virtual view position by moving, whether by hand, head, or other body part, a virtual camera about a displayed captured scene, such as with VR, but otherwise could be a user selection on a user interface on any computing device screen or other user interface device. The origination of the virtual view position is not particularly limited.

The view position unit 110 compares the desired virtual view position of the image and the left and right input images to form interpolation ratios (or weights) w 150 that indicate the location of the virtual view relative to the left or right input image, and may be referred to as the target or virtual view position (or target virtual view position). By one approach, the interpolation ratio or virtual view position w is based on linear interpolation, and may be computed simply as a fraction of the distance from the virtual view position to one of the left and right image views over the total distance between the left and right image views. This operation may simply include obtaining w from positioning units of a camera. By one form, as mentioned, the virtual views may be positioned at predetermined intervals so that when the virtual view is in the middle of the left and right image views, w is 0.5, and when a third of the total distance between left and right image views, and from one of the left and right views, w is 0.33, and so forth. When the virtual view is positioned more randomly, such as by selection by a user, the interpolation weight or view position w may be generated by known methods and often based on the optical axis of the camera(s) at the camera lens for each view position. Interpolation weight w also could be based on either a two-dimensional or three-dimensional computation.

Due to this arrangement then, interpolation weight w has values within a range from 0 to 1.

Process 300 then may include "form left and right warped images" 314, and this involves "warp images to target position" 316. In order to accomplish this, process 300 first may have a target disparity map unit 112 "generate target disparity maps" 318. The target disparity maps are generated by modifying the initial LR or RL disparity maps with the interpolation target position as represented by the interpolation weight or view position w as follows $$\begin{cases} f_{l \to t} = w * f_{l \to r} \\ f_{r \to t} = (1-w) * f_{r \to l} \end{cases} \quad (4)$$

where f refers to a disparity map, t refers to target (or virtual or synthetic) image, and l and r refer to left and right respectively.

Once the target disparity maps 152 are generated with a disparity value at each or individual pixel location, process 300 may include "perform forward remapping to remap source pixel locations to target pixel locations on warped left and right images" 320, and this may be performed by the image warping unit 114. This includes applying a forward remapping algorithm to remap or warp the source pixels to the target pixel locations as follows:

$$\hat{I}_r(i+f_{l \to t}^h(i,j), j+f_{l \to t}^v(i,j)) = I_l(i,j) \quad (5)$$

$$\hat{I}_r(i+f_{r \to t}^h(i,j), j+f_{r \to t}^v(i,j)) = I_r(i,j) \quad (6)$$

where $\hat{I}_r$ is the warped image at a target position (view position 14) that is warped from the left input image, and $\hat{I}_r$ is the warped image at the target position that is warped from the right input image. The superscript h refers to the horizontal disparity while v refers to the vertical disparity. The warped images 154 then may be provided to (or obtained as needed for) both an image merging unit 116 and a gradient map unit 118. The merging unit 116 also receives the confidence values (or map thereof) 148.

The Process 300 then may include "merge remapped pixels from warped images depending on consensus rule using confidence values" 322. The merging unit 116 then merges the two warped images together following a consensus rule below thereby forming a merged image 156 that represents an image guidance field.

$$\hat{I}(i,j) = \begin{cases} \hat{I}_l(i,j) * c_l(i,j), & \text{if } \hat{I}_r(i,j) = 0 \\ \hat{I}_r(i,j) * c_r(i,j), & \text{if } \hat{I}_l(i,j) = 0 \\ \hat{I}_l(i,j) * c_l(i,j), & \text{if abs}(\hat{I}_r(i,j) - \hat{I}_l(i,j)) < T \text{ threshold} \\ \text{Else, no value} \end{cases} \quad (7)$$

where $\hat{I}$ is the merged pixel image data value (here R, G, or B chroma value for example), $c_l(\ )$ and $c_r(\ )$ are the left and right confidence values for the corresponding left and right images. An image value of zero (0) indicates no image data at the pixel location. The threshold T is determined by experimentation. The first two lines (or terms) of the rule fills the pixel location on the merged image with the image data of the left or right warped image when the other of the left or right warped images does not have image data for a pixel location being analyzed. The third line (or term) defaults to the left warped image when the differences between the two warped images are small (or less than threshold T), although a right image default could be used instead. Otherwise, when the differences in image data value between the warped images is large, or when the confidence value is small, such as zero (0), then the merged image pixel location is not assigned an image value from the warped images or anywhere else, and is considered a hole to be filled later. This avoids inaccurate data from the disparity maps infecting the merged image.

Figure 8:
FIG. 8 illustrates an example image guidance field formed as a merged image with holes according to at least one of the implementations herein.

Referring to FIG. 8, an example merged image 800 has holes 802, and may correspond to merged image 156. The holes are illustrated as white pixel locations. The merged image 800 has a large number of holes without a RGB value mostly because of inaccurate disparity estimation of holes (occlusion and disocclusion regions).

By one approach, once a merged image is formed as the image guidance field, process 300 may include "perform gradient-based interpolation to generate image data of virtual view image" 324. Such an operation performs interpolation computations without using the pixel image data values of the input left and right images in the interpolation equation itself. By one form, either the gradients of the merged image (or image guidance field) are used when image data is present at a current pixel location on the merged image or a gradient formed by using the disparity-based warped images are used when no image data is at a current pixel location on the merged image. This is repeated for each RGB chroma channel until a virtual view image is formed for each color channel, and the channel virtual view images for each chroma channel are combined to form a single final virtual view image with RGB values at each pixel location. The details are provided by process 700 (FIGS. 7A-7B).

Figure 7A:
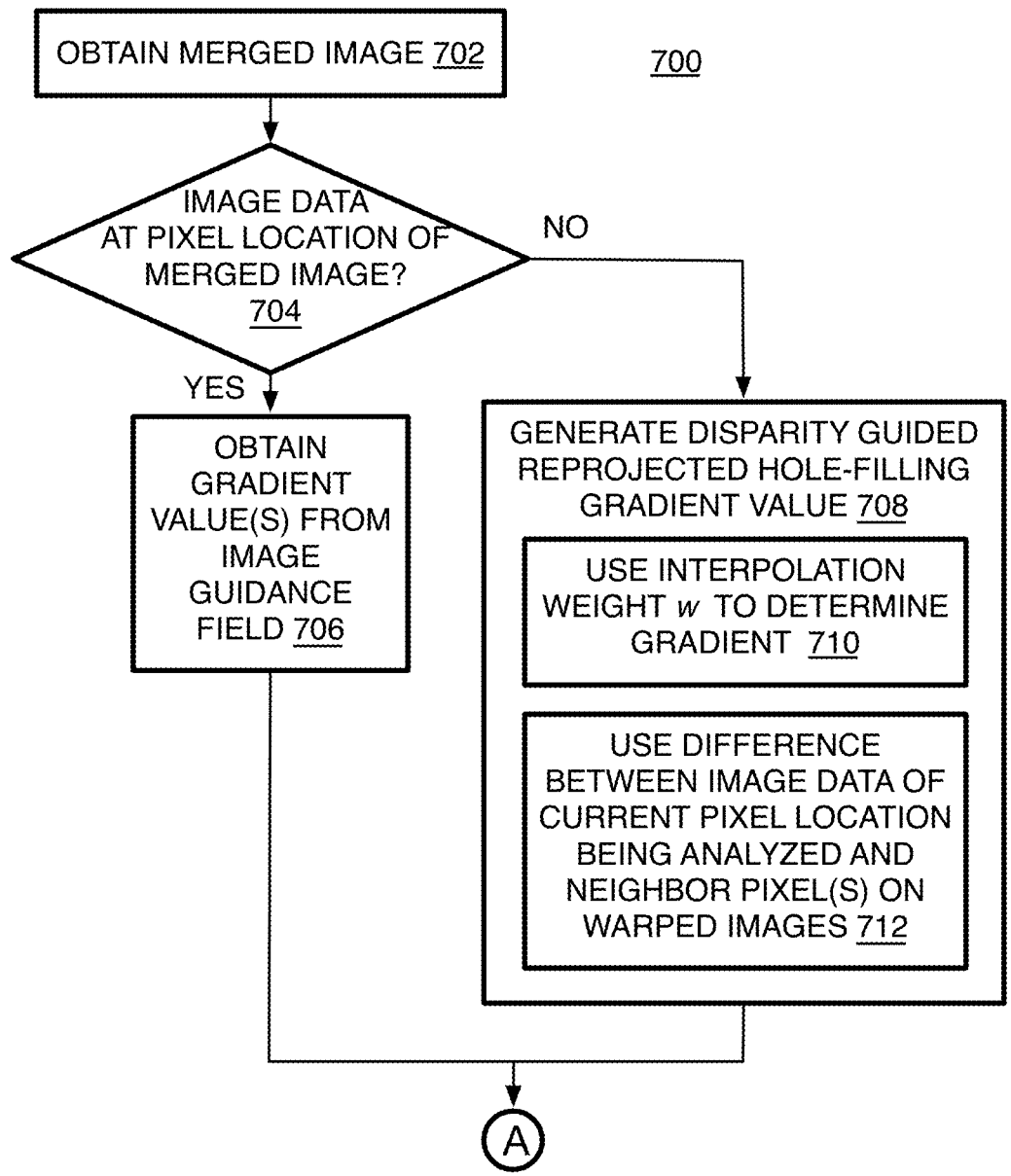
FIGS. 7A-7B is a flow chart of an example method of interpolation and hole filling for robust virtual view generation between camera views according to at least one of the implementations herein.
Figure 7C:
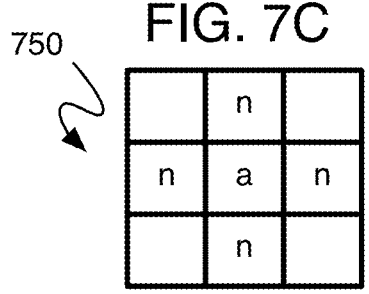
FIG. 7C is a schematic diagram of an example pixel pattern used for the interpolation and hole filling of FIGS. 7A-7B and according to at least one of the implementations herein.
Figure 7B:
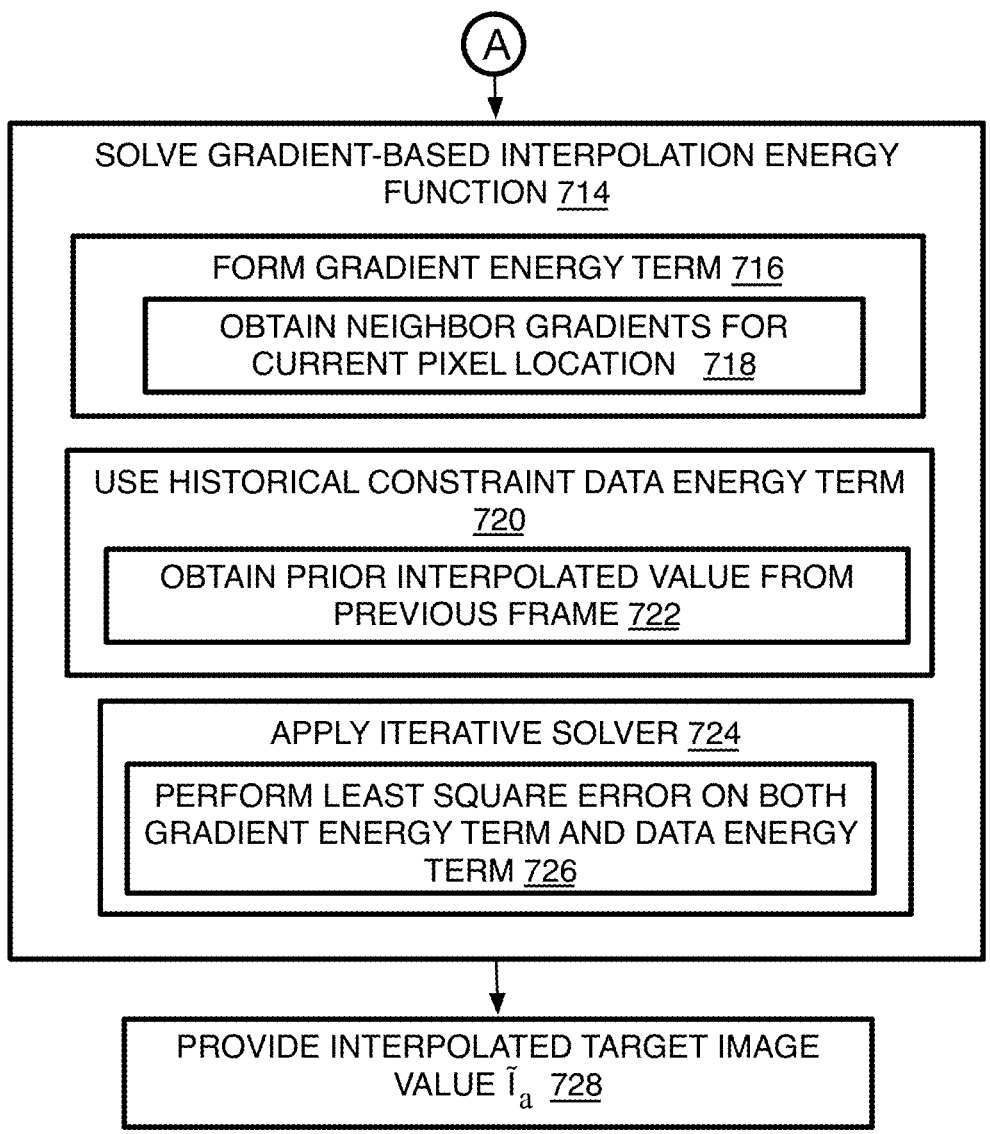

Referring to FIGS. 7A-7B, an example process 700 for generating a virtual view of a scene, and particularly to solve a gradient-based interpolation and hole-filling energy equation thereby generating interpolated pixel image data values, and arranged in accordance with at least some implementations of the present disclosure, may include one or more operations 702-728, generally numbered evenly. By way of non-limiting example, process 700 may form at least part of a virtual view generation process as performed by device 100 as discussed herein. Furthermore, process 300 will be described herein with reference to system 1800 of FIG. 18.

Process 700 first may include "obtain merged image" 702, and as provided by the image merging unit 116 for example.

Thereafter, a gradient unit 118 may determine whether image data exists at a current pixel location being analyzed on the merged image, such that process 700 includes the inquiry "image data at pixel location of merged image?" 704. The gradient unit 118 also may generate and provide gradient values that are needed to perform the gradient-based interpolation (and hole-filling) energy function.

Thus, if image data exists at least at the current pixel location, process 700 may include "obtain gradient value(s) from image guidance field" 706 so that the gradient unit 118 obtains an interpolated data reprojected gradient value from a gradient map of the merged image. Particularly, when data is present at a pixel location being analyzed on the merged image 1 according to the consensus equation (7), then process 700 has the gradient unit 118 generate the gradient map for the merged image, if not performed already, and obtain the gradients of the current pixel location. The gradient map is a target gradient map of the virtual view at view position 14. In this case, gradients are generated by known gradient algorithms such as Sobel, and so forth, to generate gradients $g_{a,n}$ used below for the interpolation to generate the final virtual image 160, and where a stands for current pixel location being analyzed, and n refers to neighbor pixel location relative to the current pixel location a. The gradients may be generated for all pixels a with image data and this forms the gradient map of the image guidance field.

By one example, the gradients used for the energy equation are gradients of the upper, lower, left, and right neighbors n of pixel location a and pixel location a itself (as shown on the gradient pattern on image region 750 of FIG. 7A) but other or more neighbor locations could be used, such as all eight neighbor pixels including neighbors at the corners of the current pixel a. Once the gradients are obtained, the gradients are provided to a hole-filling interpolation unit 120. Also, it will be appreciated that this is performed for each of the chroma RGB channels separately.

Returning to the inquiry at operation 704, when no image data exists at least at the current pixel location, the process 700 may include "generate disparity guided reprojected hole-filling gradient value" 708 since the image guidance field cannot provide guidance in this case. By this approach, this hole-filling gradient may be obtained instead of the image guidance field gradient whenever the current pixel location or any of the neighbor pixel locations of the desired gradient pattern to be used is lacking image data. By one form, if any one of the neighbor pixel locations is missing, then all of the gradients for a current pixel location are computed this way. By another approach, only the gradient of neighbor pixel locations with the missing image data has the gradient computed this way. In this case, the other neighbor pixel locations with image data may have their gradients obtained from the image guidance field instead.

To generate the gradient value, process 700 may include "use interpolation weight w to determine gradient" 710, and this is the same interpolation weight (or view position) w used above in equation (4) to generate target disparities from the LR-RL initial disparity maps. Specifically, when certain regions of the merged image 1 are blank according to consensus equation (7) with no RGB chroma value, then the image guidance field cannot provide any valid guidance information. In this case, the interpolation and hole filling energy equation recited below (equations (9), (10), and (11)) is forced to ignore the image guidance field and preserve disparity guided reprojected gradient values instead to automatically fill in the blank regions of the guided image field. In this case, when image data is missing from the merged image, the gradient map of $g_{a,n}$ values is generated with respect to the image data of the remapped or warped left and right images $\hat{I}^l$ and $\hat{I}^r$ 154 that are used to form the merged image $\hat{I}$ 156 in the first place, and may be generated for each of the RGB color channels. For example, the gradient map of the disparity guided reprojected gradient values may be formed by using the difference between image data of a pixel location being analyzed and neighbor pixel(s) on the warped images 712. By one example, these gradients may be computed by:

$$g_{a,n}=w*(\hat{I}_a^l-\hat{I}_n^l)+(1-w)*(\hat{I}_a^r-\hat{I}_n^r) \qquad (8)$$

again, where a here stands for current pixel location being analyzed, n refers to neighbor pixel location relative to the current pixel location a, $g_{a,n}$ is the gradient between the pixel locations a and n, and w refers to the same interpolation ratio or weight (or view position) mentioned above. Such gradients may be generated as needed or may be generated as a preliminary operation to solving the energy equation to form a hole-filling gradient map 158.

Once the gradient maps 158 are generated, or once current and neighbor gradient values are obtained if being generated for each current pixel location as needed, process 700 may include "solve gradient-based interpolation energy function" 714, and this may be performed by interpolation and hole-filling unit 120. An energy function can be used to define an optimization problem and that can be minimized to generate the final interpolated image data of a final virtual (or synthesized) image 160 as shown in Equation (9):

$$\min(E)=\min(E_g+\gamma E_d) \qquad (9)$$

The energy function is a combination of a gradient energy or smoothing term $E_g$ and a data energy (or historical constraint) term $E_d$. The variable γ is a weighting factor. The details are explained as follows.

Process 700 may include "form gradient energy term" 716. Thus, an energy smoothing or gradient energy term is used that preserves the image gradients of the image guidance field when possible but otherwise by preserving the disparity-guided reprojected gradient values. In an implementation, such gradient energy term is provided by Equation (10):

$$E_g=\Sigma_a\Sigma_{n\in N_a}\|\tilde{I}_a-\tilde{I}_n-g_{a,n}\|^2 \qquad (10)$$

where $E_g$ is a gradient energy term (or smoothing term) that measures similarity (or difference) between (1) either the gradients of the image guidance field or the gradients of the warped left and right images ($g_{a,n}$), and (2) the difference between the current and neighbor pixel image value of the final virtual image. Also, $\tilde{I}_a$ is a final or target interpolated image current pixel value and is the unknown in the equation that is to be generated, $N_a$ is the neighborhood pixel locations of pixel a where the neighbors are the upper, lower, left, and right neighbors n of pixel location a (as shown on image region 750 of FIG. 7A and as discussed above) but other or more neighbor locations could be used also as mentioned above. The gradient energy term also is normalized by mean square as shown and as mentioned above to preserve the gradients. Thus, for the energy term equation (10), process 700 need only include "obtain neighbor gradients for current pixel location" 718 and as described above. No other values are needed for this term. Thus, it will be understood that the pixel image values of the input left and right images are not used here in this equation either.

This energy equation (10) is a Poisson-based interpolation equation. Specifically, to generate the interpolated views, existing methods usually first use some heuristic (or trial and error) rules to fill the holes, such as bilinear, bicubic, and nearest neighbor interpolation, cross-view filling, or gradient shift that uses the image value of the input images directly in the interpolation equation itself. Then, a refinement algorithm is applied to account for the inaccurately filled information. These types of algorithms only work well if accurate disparity maps are generated. Any inaccurate disparity value may result in significant noticeable artifacts in the final result. Further, the refinement step can alleviate artifacts to some extent. However, when disparity errors are too large, refinement usually only can hide the artifacts by blurring them.

Therefore, instead of filling the holes and then refining the result, the interpolation is treated here as an inpainting task and uses a Poisson editing technique to generate the results. For example, and as mentioned above, see Pérez, P., et al., *Poisson image editing*, ACM Transactions on graphics (TOG) 22.3, 313-318 (2003). By applying Poisson image editing, the energy function $E_g$ can be minimized to preserve the RGB values of the image guidance field.

Also, process 700 may include "use historical constraint data energy term" 720. Since the gradient energy term provided by Equation (10) is a differential due to the use of gradients, a boundary condition is added to define an overall energy minimization problem. The boundary condition is characterized as a data energy (or historical constraint) term and may be defined by:

$$E_d = \|\tilde{I}_a - p_a\|^2 \quad (11)$$

where p is the interpolated pixel image value of the same pixel location but in the prior image, and where $\tilde{I}_a$ is the current pixel image value of the final virtual view image to be determined (e.g., the image pixel value being sought). Thus, process 700 may include "obtain prior interpolated value from previous frame" 722. Notably, the data energy term provided by Equation (11) measures the similarity (or difference) between final virtual image 160 and the prior virtual image. This term also is normalized with mean square.

The full energy equation then can be expressed as:

$$\min(E) = \min\left(\sum_a \sum_{n \in N_a} \|\tilde{I}_a - \tilde{I}_n - g_{a,n}\|^2 + \gamma \|\tilde{I}_a - p_a\|^2\right) \quad (12)$$

$$\gamma = \begin{cases} 0, & \text{if } p_a = 0 \\ 0.5, & \text{if } p_a \neq 0 \end{cases} \quad (13)$$

where weighting factor γ weights the similarity between final virtual image 160 and the prior virtual image for the current pixel location. The weighting factor may be any suitable value. In an implementation, the current example (equation (13)) shows a weight factor of 0.5 when a prior image has an image value at the same pixel location, but otherwise zero. The weighting factor is determined by experimentation.

Process 700 may include "apply iterative solver" 724. The above energy equation (12) forms a sparse linear system, which can be solved by an iteratively applied conjugate gradient solver that converges to a most correct $\tilde{I}_a$ for each pixel image value of the final virtual view image. This may involve having process 700 include "determine least square error on both gradient energy term and data energy term" 726, and while summing the gradient differences of the different neighbors for the same current pixel location, then summing these neighbor results for all pixel locations a=0 to A on the frame, or at least those being analyzed, on the frame, and as a single iteration. Finally, the frame totals are minimized to obtain the minimum energy of the equation. Thus by one form, the minimization of the energy equation is on the frame level. The energy equation (12) is applied separately for each of the three RGB color channels.

Process 700 may include "provide interpolated target image value $\tilde{I}_a$" 728, and this may include provide a final interpolated value for a current pixel location, and depending on the color space scheme, one interpolated value for each color channel, so that for RGB, each or individual pixel location has three interpolated values to form one complete virtual or synthesized image.

Figure 9:
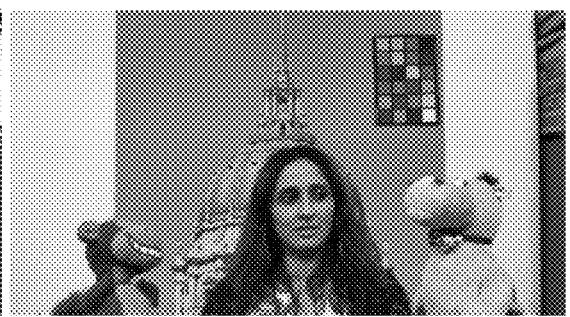
FIG. 9 illustrates an example final interpolated virtual image according to at least one of the implementations herein.

Returning to process 300, process 300 may include "provide image data of final virtual view image" 326, and where processing may continue so that the final virtual image is provided for presentation to the viewer. The final virtual image may be provided for presentation using any suitable technique or techniques. In an implementation, providing the final virtual image for presentation to the viewer includes transmitting the final virtual image to a receiving device having a display screen. In an implementation, providing the final virtual view image for presentation to the viewer includes transmitting final virtual view image to a memory. As used herein, providing an image for presentation includes transmitting the image to a display device, storing the image to memory for later display, and/or transmitting the image to another device for display at that device. Image 900 (FIG. 9) provides an example final virtual view interpolated image that is a result of the implementations used herein and that fill the holes 802 of the merged image 800 (FIG. 8).

Process 300, and in turn process 700, may be repeated any number of times either in series or in parallel for any number of input image pairs, paired video frames, or the like. As discussed, process 300 may provide for virtual images, views, image frames, video frames, etc. that correspond to a view position relative to a scene.

Process 300 may be implemented by any suitable device, system, or platform such as those discussed herein. In an implementation, process 300 is implemented by a device having a memory to store the first and second input images, as well as any other discussed data structure, and a processor to perform operations 302-326 and 702-728. In an implementation, the memory and the processor are implemented via a monolithic field programmable gate array integrated circuit. As used herein, the term monolithic indicates a device that is discrete from other devices, although it may be coupled to other devices for communication and power supply.

Referring to FIG. 10, process 300 has an optional motion coherence operation 305 as mentioned above, and is performed by an example process 1000 for generating a virtual view of a scene, and particularly for generating disparity maps adjusted to factor frame-to-frame image content motion in a video sequence. The process 1000 is arranged in accordance with at least some implementations of the present disclosure, and may include one or more operations 1002-1020, generally numbered evenly. By way of non-limiting example, process 1000 may form at least part of a virtual view generation process as performed by device 100 as discussed herein. Furthermore, process 1000 may be described herein with reference to, or may use units of, system 1800 of FIG. 18.

Independently interpolating each video frame will introduce uttering and flickering artifacts into the interpolated videos as mentioned above. Temporal incoherent results would largely sabotage the viewing experience and cause visual fatigue to users.

To avoid these artifacts, process 1000 may include "downsample frames" 1002 to work on smaller resolution frames to avoid unnecessary large computational loads and delay that could affect real-time operation.

Process 1000 then may include "estimate motion map" 1004, which includes "determine image value differences between two frames" 1006. Particularly, this is performed by estimating a motion map between each or individual pairs of consecutive video frames by calculating RGB differences directly between corresponding pixel locations on the two images. The result is a motion map of difference values, and one motion map may be provided separately for each of the input left and right images when such images are from separate left and right video sequences.

Process 1000 then may include "refine depth data" 1008. Thus, to further compensate for the inaccurate depth information that usually happens in the object boundary regions, process 1000 may include "filter isolated motion pixels" 1010, and by one example, a median filter may be used first to remove any isolated or outlier motion pixel values. Process 1000 then may include "dilate the motion map" 1012, which enlarges the region of the motion being tracked to better ensure all motion pixels are captured in case the motion map itself is not sufficiently accurate. Thereafter, process 1000 may include "upsample motion maps" 1014, and to the original resolution of the input images in order to use the motion maps to modify the initial disparity maps, resulting in faster temporal coherence handling. Otherwise, the downsampled frames could be modified by the motion maps instead, and the frames could be upsampled thereafter.

Process 1000 now may include "refine current disparity map depending on amount of motion" 1016. Here, the current frame disparity map may be refined according to the motion map and the previous frame disparity map. This may include "use previous disparity value alone or combined with current disparity value" 1018. Specifically, for each or individual pixel, if the motion is smaller than a predefined threshold according to the difference value on the motion map for that pixel location, the previous disparity value of the prior frame is used to replace the current disparity value. Otherwise, when the motion difference value on the motion map is larger than a threshold, the current disparity value is combined with the previous disparity value together according to the current motion value. The combination may be an average, and so forth. This is performed on the left and right images separately and using the left and right disparity maps separately. Process 1000 then may include "provide disparity maps" 1020, and to the confidence reprojection unit 106 and the target disparity map unit 112 to continue the virtual view generation at operation 306 for example and as described above.

Referring to FIG. 11, the above presented virtual view generation process 300 can interpolate videos with high quality. However, solving the linear system with the energy function (12) can be very time-consuming. To accelerate the video interpolation and hole-filling, and ensure or reach real-time interpolation performance, an example process 1100 for generating a virtual view of a scene, and particularly for accelerating the virtual view generation process, is arranged in accordance with at least some implementations of the present disclosure, and may include one or more operations 1102-1120, generally numbered evenly. By way of non-limiting example, process 1100 may form at least part of a virtual view generation process as performed by device 100 as discussed herein. Furthermore, process 1100 may be described herein with reference to, or may use units of, system 1800 of FIG. 18.

Process 1100 may include "generate pyramid of scaled video frames" 1102, and this may include building a pyramid for each video frame. By one approach, a two layer pyramid is constructed having two frames of the same image each at a different scale (or resolution). By one example, a scaling factor 0.25 is used to form a smaller frame that is about a quarter of the size of the full resolution frame. A smaller or downscaled frame here refers to downscaled left and right, or first and second, input images. Other scale factors could be used instead.

Process 1100 then may include "use a smaller video frame to generate warped images, image guidance field, and gradient maps" 1104. Thus, for example, the virtual view generation operations 302 to 322 of process 300 are performed on the smaller frames to generate a small merged image of a small image guidance field. Process 1100 then may include "apply inpainting to smaller video frame" 1106, such as with operation 324 of process 300 and the operations of process 700 to generate a small scale or downscaled virtual view image with interpolated image values and holes filled, and by one example, according to the gradient-based Poisson interpolation and hole-filling energy equation (12). It will be understood that the acceleration technique described herein could be used with different interpolation equations.

Process 1100 next may include "upsample hole-filled smaller video frame to original full resolution" 1108, so that the image data of the upsampled virtual view image can be used to fill holes on a full resolution size virtual view image formed by using a full resolution image guidance field.

Specifically, process 1100 may include "use original full resolution frame to generate image guidance field in the form of a target merged image" 1110, and by using the operations 302 to 322 of process 300 as described above. Thus, this operation uses the original or full size resolution frame (or images) to generate a reprojected RGB full size or full resolution merged image as a full resolution or full size image guidance field. Process 1100 then may include "generate target gradient map" 1112, thereby providing differences of image data between pixel locations and neighbor pixel locations of the full resolution merged image as described above.

Process 1100 may include "place interpolated image data into virtual image by using gradient map of full resolution merged image to interpolate pixel image data at pixel locations that have image data from the full resolution merged image" 1114. Thus, when the full resolution merged image has image data, the interpolation equation is solved by using image guidance field gradients from the gradient map of the full resolution merged image.

Process 1100 may include "use upsampled smaller image to fill holes on full resolution virtual view image" 1116. Thus, the gradients, or gradient map when preformed, of the upsampled smaller image (or smaller video frame) is then used to fill holes on the full resolution virtual view image and that were left by the full resolution merged image due to inaccuracies on the full size disparity maps.

Process 1100 may include "refine the filled virtual view image by matching a final gradient map to the full resolution merged image gradient map" 1118. Thus, at certain pixel locations, or all pixel locations, on the resulting virtual image, the image data of the resulting virtual image is refined to match the gradient map of the full resolution image guidance field (or full resolution merged image). This is performed so that artifacts caused by the differences in the two sources may be reduced.

Process 1100 may include "provide final virtual image" 1120. This acceleration process may be performed separately for each color space channel, or color channel when RGB is being used. Thus, here, the image data of the resulting virtual images of each color space channel are combined to form a single image. The final image is then provided for further processing such as for rendering and so forth.

With the above algorithmic acceleration, generated virtual views can be rendered in real time at about 30 fps for 1080p video using a Nvidia® TitanX™ card for example.

Experiments were conducted by applying the disclosed method on a range of challenging images with very large parallax. For each testing case, two images were captured with two cameras as the input, and ten virtual or synthesized images were interpolated between the two camera views. The 5$^{th}$ interpolated image for every testing case is reported here. The presently disclosed method, labeled as method (A) on the figures, was compared to three other conventional view interpolation methods, including:

(B) a baseline method that interpolates images using reprojection with hole filling and optimization-based refinement. For the baseline method, the optimization model from Kopf J., et al. "Image-based rendering in the gradient domain." ACM Transactions on Graphics (TOG) 32.6, p. 199 (2013) was used for the refinement.

C) Facebook Surround 360 View synthesis algorithm of Facebook, Surround 360, https://github.com/facebook/Surround360. For Facebook Surround 360, the view synthesis algorithm was extracted from their shared code repository in Github.

D) The present implementation of image-based rendering in a conventional gradient domain method of Kopf cited above, referred to as (Siggraph 2013). The same initial LR-RL initial disparity maps were used for all four methods mentioned above.

Figure 4A:
FIGS. 4A and 4B are respectively example left and right input images.
Figure 4B:

Referring to FIGS. 12A to 12D-1, results were generated using input images 400 and 450 (FIGS. 4A-4B). Final virtual view images 1200, 1202, 1204, and 1206 (FIGS. 12A-12D) show the results of methods (A) to (D) respectively, and images 1208, 1210, 1212, and 1214 (FIGS. 12A-1 to 12D-1) are respectively close-ups of images 1200, 1202, 1204, and 1206. Due to the large amount of parallax, the disparity estimation is very noisy in the uniform regions and object boundary regions. The baseline method (FIGS. 12B and 12B-1) generates a result with ghosting artifacts and broken structures. The Kopf method (FIGS. 12D and 12D-1) may generate a better result than the baseline method, but still suffers from ghosting artifacts around the monkey mouth and hands region. The presently disclosed method (FIGS. 12A and 12A-1) can handle this challenging example very well with very little visible artifacts.

Referring to FIGS. 13A to 13G-1, another experiment was performed with the same parameters as that of FIGS. 12A-12D-1 except here with different input images. Here, input images 1300 and 1302 (FIGS. 13A-13B) were used to form a left-to-right disparity map 1304 (FIG. 13C) and final virtual view images 1306, 1308, 1310, and 1312 with corresponding close-up images 1314, 1316, 1318, and 1320 were generated by methods (A) to (D) respectively. The largest parallax in the two input images 1300 and 1302 was 90 pixels. As shown, baseline result (1308 and 1316) suffers from significant ghosting artifacts. While optimization-based refinement relieved some artifacts in the Kopf result (1312 and 1320), it causes severe blurring artifacts in the face and finger region.

Referring to FIGS. 14A to 14G-1, yet another experiment was performed with the same parameters as that of FIGS. 12A-12D-1 except with different input images. Here, input images 1400 and 1402 (FIGS. 14A-14B) were used to form a left-to-right disparity map 1404 (FIG. 14C), and final virtual view images 1406, 1408, 1410, and 1412 with corresponding close-up images 1414, 1416, 1418, and 1420 were generated by methods (A) to (D) respectively. The input images 1400 and 1402 contain a large amount of parallax, and the disparity estimation result 1404 is extremely noisy and inaccurate in several salient regions. Both baseline method (1408 and 1416) and Kopf method (1412 and 1420) generate results with severe ghosting artifacts. Both the ear and left side of the face have been duplicated. In contrast, the result of the methods disclosed herein (1406 and 1414) largely alleviate the ghosting artifacts.

Referring to FIGS. 15A-15B, 16, and 17, the present virtual view generation method disclosed herein interpolates views extremely well and from images with relatively large parallaxes and noisy and inaccurate depth (or disparity) information. In yet another experiment, input images 1500 and 1550 were used with a known optical flow method for disparity map generation. An optical flow map 1600 shows color changes depending on the depth of the objects in the image. With these accurate disparity estimation algorithms, such as the advanced optical flow methods, the presently disclosed virtual view generation methods easily generate artifact-free view interpolation results as shown by final virtual view image 1700.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 18:
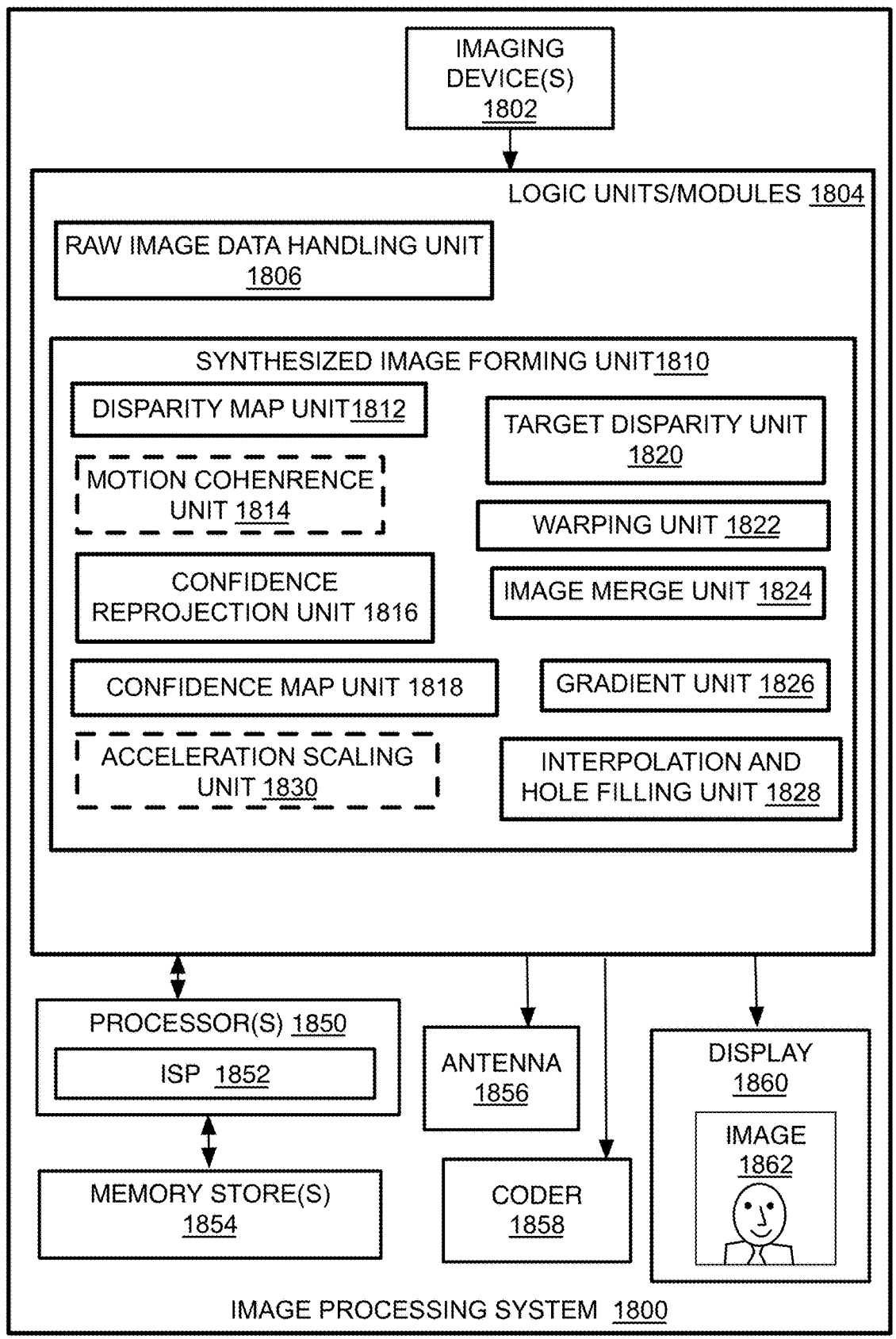
FIG. 18 is an illustrative diagram of an example system for generating a virtual view of a scene.

Referring to FIG. 18, an example image processing system 1800 for generating a virtual view of a scene is arranged in accordance with at least some implementations of the present disclosure. As shown in FIG. 18, system 1800 may include processor(s) 1850 which may or may not include one or more image signal processors (ISP) 1852, and a memory store(s) 1854. Also as shown, system 1800 may have logic units or modules 1804 including a raw image data handling unit 1806 that may process image data from an imaging device 1802, such as one or more cameras, on, or communicating with, the system 1800. The raw image data handling unit 1806 may perform pre-processing on the raw image data sufficient for virtual view generation, and this may include conversion between YUV and RGB color space as needed for example. The logic modules 1804 may have a synthesized image forming unit 1810 that may include a disparity map unit 1812, optionally a motion coherence unit 1814, a confidence reprojection unit 1816, a confidence map unit 1818, a target disparity unit 1820, a warping or image warping unit 1822, an image merge unit 1824, a gradient unit 1826, an interpolation and hole filling unit 1828, and optionally an acceleration scaling unit 1830. In the example of system 1800, memory 1854 may store image or frame data, reprojected and/or warped image or frame data, filled warped image or frame data, refined warped image or frame data, final virtual image or frame data, confidence values, gradient values or maps, or any other data discussed herein.

System 1800 also may have an antenna 1856 for transmitting or receiving image data, a coder 1858 for encoding or decoding the image data, and a display 1860 with a screen capable of showing an image 1862.

The names of the units here may have the same or similar names to that of device 100 such that the units perform the same or similar tasks as those on device 100. Otherwise, the operation of the units is described as needed in the processes detailed herein.

As shown, in some examples, one or more or portions of the synthesized image forming unit 1810 are implemented via ISP 1852. In other examples, one or more or portions of the synthesized image forming unit 1810 are implemented via a central processor forming processor(s) 1850, an image processing unit, an image processing pipeline, an image signal processor, or the like. In some examples, one or more or portions of the synthesized image forming unit 1810 are implemented in hardware as a system-on-a-chip (SoC) or other specific purpose hardware or other shared hardware. In some examples, one or more or portions of the synthesized image forming unit 1810 are implemented in hardware via a field programmable gate array (FPGA).

Processor(s) 1850 and image signal processor 1852 may include any number and type of image or graphics processing units that may provide the operations as discussed herein. Such operations may be implemented via software or hardware or a combination thereof. For example, image signal processor 1852 may include circuitry dedicated to manipulate and/or analyze images obtained from memory 1854. Central processor 1850 may include any number and type of processing units or modules that may provide control and other high level functions for system 1800 and/or provide any operations as discussed herein. Memory 1854 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1854 may be implemented by cache memory. In an implementation, one or more or portions of the synthesized image forming unit 1810 are implemented via an execution unit (EU) of image processor 1802. The EU may include, for example, programmable logic or circuitry such as a logic core or cores that may provide a wide array of programmable logic functions. In an implementation, one or more or portions of the synthesized image forming unit 1810 are implemented via dedicated hardware such as fixed function circuitry or the like. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone or camera array. Those skilled in the art may recognize that systems described herein may include additional components that have not been depicted in the corresponding figures. For example, the systems discussed herein may include additional components that have not been depicted in the interest of clarity.

Figure 19:
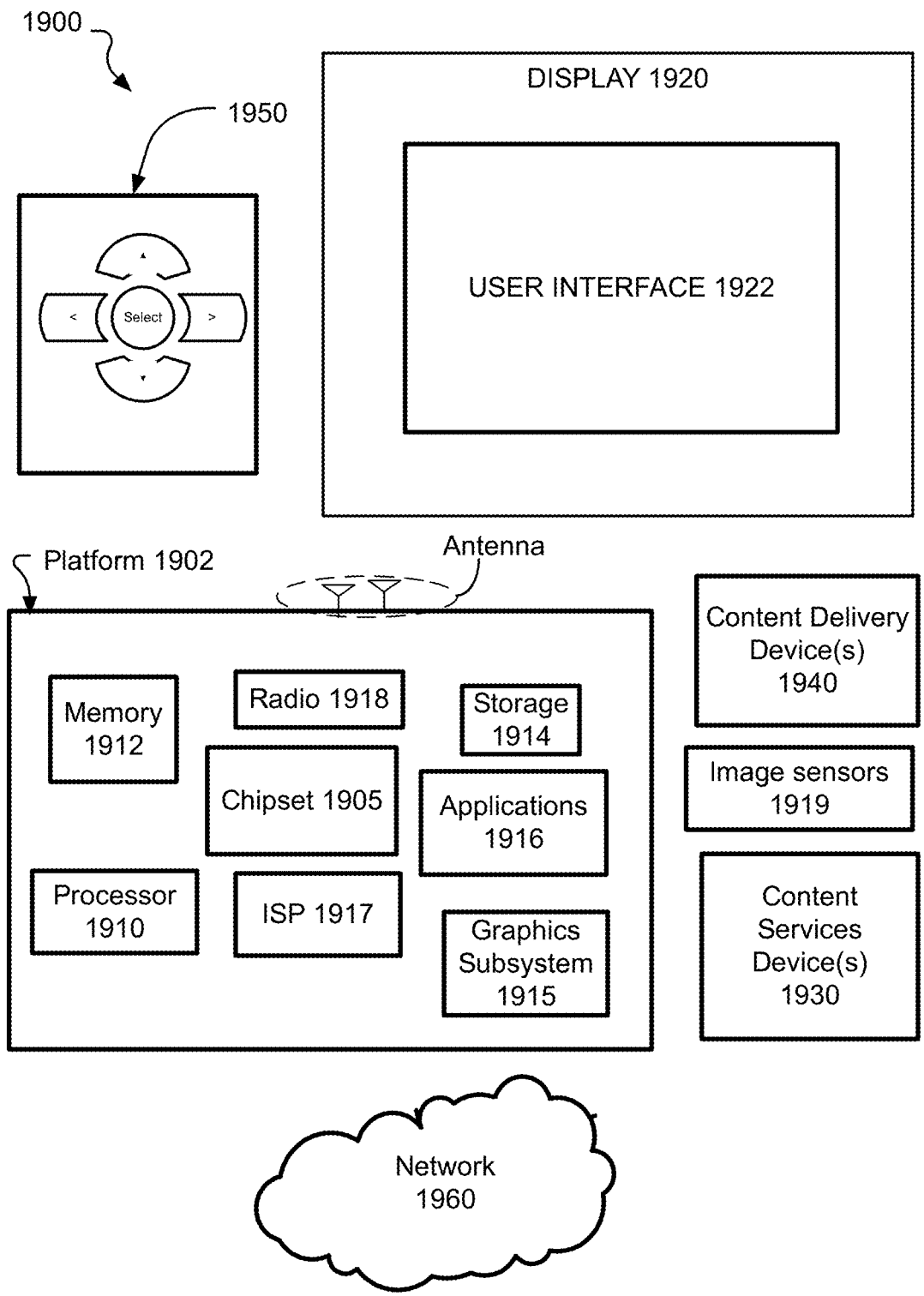
FIG. 19 is an illustrative diagram of an example system.

FIG. 19 is an illustrative diagram of an example system 1900, arranged in accordance with at least some implementations of the present disclosure. In various implementations, system 1900 may be a mobile device system although system 1900 is not limited to this context. For example, system 1900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1900 includes a platform 1902 coupled to a display 1920. Platform 1902 may receive content from a content device such as content services device(s) 1930 or content delivery device(s) 1940 or other content sources such as image sensors 1919. For example, platform 1902 may receive image data as discussed herein from image sensors 1919 or any other content source. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, antenna, storage 1914, graphics subsystem 1915, applications 1916, image signal processor 1917 and/or radio 1918. Chipset 1905 may provide intercommunication among processor 1910, memory 1912, storage 1914, graphics subsystem 1915, applications 1916, image signal processor 1917 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Image signal processor 1917 may be implemented as a specialized digital signal processor or the like used for image processing. In some examples, image signal processor 1917 may be implemented based on a single instruction multiple data or multiple instruction multiple data architecture or the like. In some examples, image signal processor 1917 may be characterized as a media processor. As discussed herein, image signal processor 1917 may be implemented based on a system on a chip architecture and/or based on a multi-core architecture.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, DisplayPort, wireless HDMI, and/or wireless HD compliant techniques. Graphics subsystem 1915 may be integrated into processor 1910 or chipset 1905. In some implementations, graphics subsystem 1915 may be a stand-alone device communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

Image sensors 1919 may include any suitable image sensors that may provide image data based on a scene. For example, image sensors 1919 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1919 may include any device that may detect information of a scene to generate image data.

In various implementations, content services device(s) 1930 may include a cable television box, personal computer, network, telephone, Internet enabled devices or appliance capable of delivering digital information and/or content, and any other similar device capable of uni-directionally or bi-directionally communicating content between content providers and platform 1902 and/or display 1920, via network 1960 or directly. It will be appreciated that the content may be communicated uni-directionally and/or bi-directionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of navigation controller 1950 may be used to interact with user interface 1922, for example. In various implementations, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In various implementations, navigation controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 5.1 surround sound audio and/or high definition 7.1 surround sound audio, for example. Drivers may include a graphics driver for integrated graphics platforms. In various implementations, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various implementations, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various implementations, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
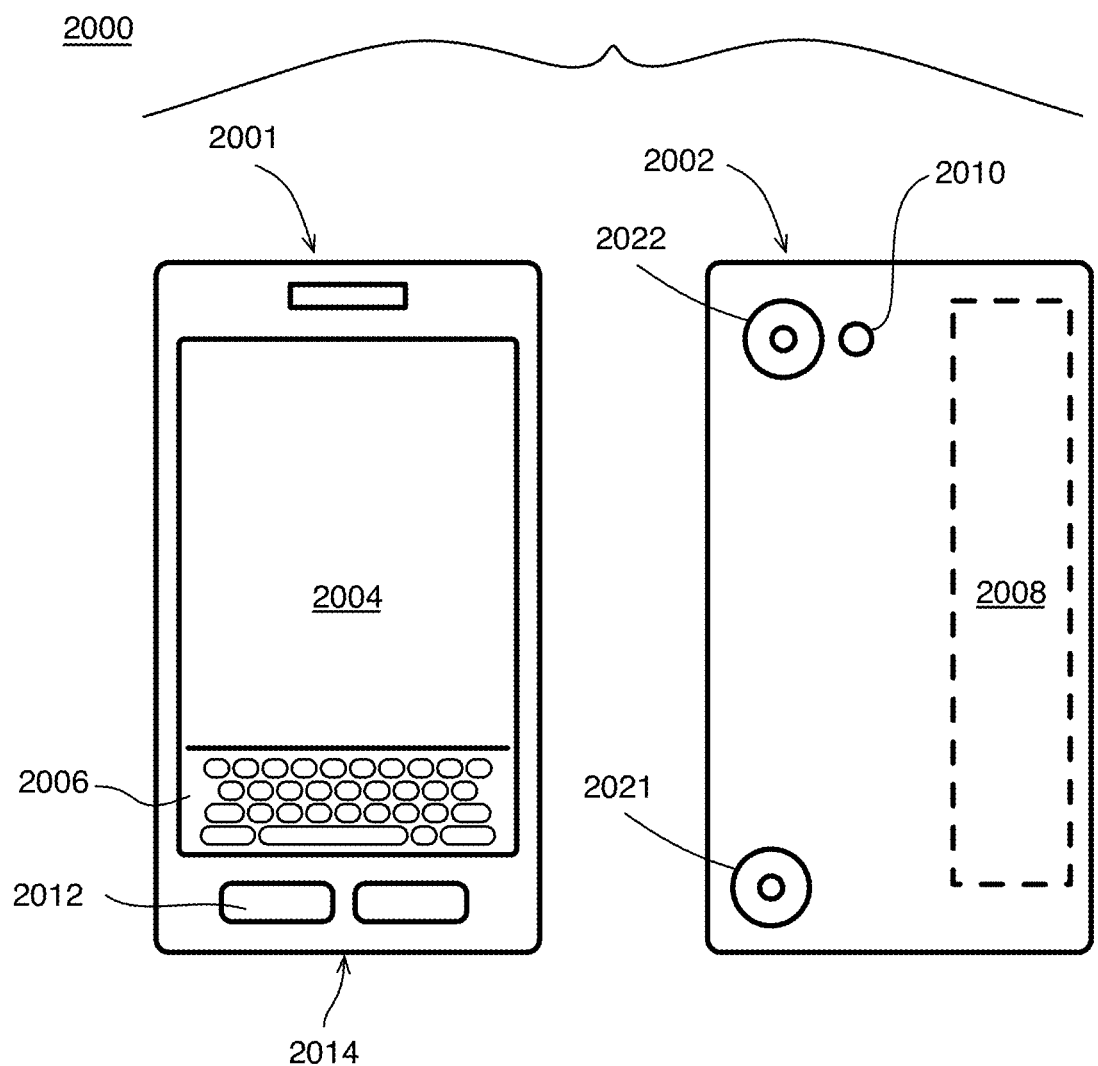
FIG. 20 illustrates an example device, all arranged in accordance with at least some implementations of the present disclosure.

As described above, system 1900 may be embodied in varying physical styles or form factors. FIG. 20 illustrates an example small form factor device 2000, arranged in accordance with at least some implementations of the present disclosure. In some examples, system 1800 or 1900 may be implemented via device 2000. In other examples, other systems, components, or modules discussed herein or portions thereof may be implemented via device 2000. In various implementations, for example, device 2000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various implementations, for example, a mobile computing device may be implemented as a smartphone capable of executing computer applications, as well as voice communications and/or data communications. Although some implementations may be described with a mobile computing device implemented as a smartphone by way of example, it may be appreciated that other implementations may be implemented using other wireless mobile computing devices as well. The implementations are not limited in this context.

As shown in FIG. 20, device 2000 may include a housing with a front 2001 and a back 2002. Device 2000 includes a display 2004, an input/output (I/O) device 2006, a color camera 2021, a color camera 2022, and an integrated antenna 2008. In some implementations, color camera 2021 and color camera 2022 attain images as discussed herein. In some implementations, device 2000 does not include color camera 2021 and 2022 and device 2000 attains input image data (e.g., any input image data discussed herein) from another device. Device 2000 also may include navigation features 2012. I/O device 2006 may include any suitable I/O device for entering information into a mobile computing device. Examples for I/O device 2006 may include an alphanumeric keyboard, a numeric keypad, a touch pad, input keys, buttons, switches, microphones, speakers, voice recognition device and software, and so forth. Information also may be entered into device 2000 by way of microphone (not shown), or may be digitized by a voice recognition device. As shown, device 2000 may include color cameras 2021, 2022, and a flash 2010 integrated into back 2002 (or elsewhere) of device 2000. In other examples, color cameras 2021, 2022, and flash 2010 may be integrated into front 2001 of device 2000 or both front and back sets of cameras may be provided. Color cameras 2021, 2022 and a flash 2010 may be components of a camera module to originate color image data with IR texture correction that may be processed into an image or streaming video that is output to display 2004 and/or communicated remotely from device 2000 via antenna 2008 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a device for generating a virtual view image of a scene comprises a memory to store first and second input images respectively corresponding to first and second view positions of the same scene; and a processor coupled to the memory, the processor being arranged to operate by: generating a merged image of a target virtual view between the first and second view positions and by merging warped images associated with the first and second input images; and filling holes on a virtual view image at the target virtual view generated by using the merged image and comprising solving an energy equation that compares (1) a difference between a final interpolated current pixel value and a final interpolated neighbor pixel value that are both unknowns in the equation and (2) a gradient generated by using image values of the warped images and at least one interpolation weight when no image data exists at a current pixel location on the merged image and corresponding to the final interpolated current pixel value being computed.

Further to the first implementation, the processor is arranged to operate by using the energy equation to place interpolated image data on the virtual view image when the merged image has image data at the current pixel location and wherein the gradient of the energy equation is generated differently compared to the gradient computed when the merged image does not have image data at the current pixel location.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps, wherein the confidence values indicate a difference between (1) image data at a pixel location on the first or second input image and (2) image data of the same pixel location on a reprojected first or second image formed by adding a disparity of the initial disparity maps to the image data of the first or second input image.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps, wherein the confidence value is used to determine whether a pixel location of the merged image should have the image value of one of the warped images, or no image data.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps, wherein a low confidence value provides the merged image with no image data at a pixel location even when one of the warped images has pixel image data of the pixel location that could be placed into the merged image.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps, wherein the confidence value is 0 for low confidence and 1 for high confidence.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps, wherein the processor is arranged to operate by generating the warped images comprising using a target disparity map of differences between pixel image data location on one of the first and second input images and a pixel location at the target virtual view.

Further to the first implementation, the processor is arranged to operate by generating one or more initial disparity maps that indicate the difference of pixel location of image data between the first and second input images; and forming the merged image comprising using confidence values that indicate the accuracy of at least one of the initial disparity maps, wherein the processor is arranged to operate by generating the warped images comprising using a target disparity map of differences between pixel image data location on one of the first and second input images and a pixel location at the target virtual view, and wherein the target disparity map is formed by using the initial disparity maps.

Further to the first implementation, the energy equation has a gradient energy term that is at least partly based on Poisson image editing and is solved iteratively while minimizing the energy equation to compute the final interpolated current pixel value.

Further to the first implementation, the processor is arranged to operate by maintaining temporal coherence comprising generating one or more motion maps for the first and second input images indicating motion of image data from one frame to another frame along a video sequence wherein one of the frames is the first or second input image; modifying initial disparity maps indicating the difference between pixel location of image data between the first and second input images and modified depending on the motion maps; and using the initial disparity maps to form at least one of the warped images and confidence values that indicate accuracy of the initial disparity maps and used to form the merged image.

Further to the first implementation, the processor is arranged to operate by generating a full resolution merged image by using full resolution versions of the first and second images; generating a downscaled merged image by using downscaled versions of the first and second images and downscaled warped images; forming a downscaled virtual image by using the downscaled merged image and downscaled warped images and the energy equation; and using the image data of the downscaled virtual image to fill holes on a full resolution virtual image generated by using the full resolution merged image.

By one or more example second implementations, a computer-implemented method of generating a virtual view image of a scene comprises obtaining image data of first and second input images respectively corresponding to first and second view positions of the same scene; generating at least one initial disparity map that indicates a difference of pixel location of image data between the first and second input images; generating one or more confidence values for one or more pixel locations of the first and second images and that indicate accuracy of the initial disparity maps; generating a merged image at a virtual view by using the confidence values; and generating the virtual view image at the virtual view by using the merged image.

Further to the second implementation, the confidence values indicate a difference between (1) image data at a pixel location on the first or second input image and (2) image data of the same pixel location on a reprojected first or second image formed by adding a disparity of the initial disparity maps to the image data of the first or second input image.

Further to the second implementation, the generating of the merged image comprises leaving a pixel location on the merged image without an image data value when the confidence value is considered low.

Further to the second implementation, the method comprises forming one or more target disparity maps that indicate a difference of pixel location of image data between either of the first and second input images and a virtual view position of the virtual view image, and formed by using the initial disparity maps; warping the first and second input images to form first and second warped images by using the target disparity maps; and forming the merged image by using rules that use both the confidence values and image data of the warped images.

Further to the second implementation, the method comprises generating interpolated image values for the virtual view image based on the merged image comprising iteratively minimizing an energy equation with a gradient energy term that uses a gradient value of a pixel location that is computed differently depending on whether or not the pixel location has image data on the merged image.

Further to the second implementation, the method comprises generating interpolated image values for the virtual view image based on the merged image comprising iteratively minimizing an energy equation with a gradient energy term that uses a gradient value of a pixel location that is computed differently depending on whether or not the pixel location has image data on the merged image; and computing the gradient value at least partly depending on image data values of warped images used to form the merged image and an interpolation weight when no image data is present at the pixel location on the merged image.

Further to the second implementation, the method comprises generating a full resolution merged image by using full resolution versions of the first and second images; generating a downscaled merged image by using downscaled versions of the first and second images and downscaled warped images used to form the merged image; forming a downscaled virtual view image by using the downscaled merged image, downscaled warped images, and the energy equation; and using the image data of the downscaled virtual view image to fill holes on a full resolution virtual view image generated by using the full resolution merged image.

As an example third implementation, at least one non-transitory machine readable medium comprises a plurality of instructions that, in response to being executed on a computing device, cause the computing device to generate a virtual view image of a scene by: obtaining one or more initial disparity maps indicating the difference of image data position between image data of first and second input images each having a different view of the scene and for both full resolution versions and downscaled versions of the input images; generating a full resolution merged image by using the one or more full resolution disparity maps; generating a downscaled merged image by using the downscaled disparity maps; using a gradient-based interpolation and hole filling equation to form a downscaled virtual image by using image data of the merged image; generating the virtual view image comprising using a gradient-based interpolation and hole filling equation and the full resolution merged image; and filling holes in the virtual view image comprising using image data associated with the downscaled virtual image rather than the full resolution merged image.

Further to the third implementation, the instructions cause the computing device to operate by upscaling the downscaled virtual image to the full resolution before using the image data of the downscaled virtual image to fill the holes of the virtual view image.

Further to the third implementation, wherein the instructions cause the computing device to operate by respectively forming the full resolution and downscaled merged images comprising using pixel-level confidence values that indicate the accuracy of the initial disparity maps.

Further to the third implementation, the instructions cause the computing device to operate by generating downscaled warped images to be merged to form the downscaled merged image, the generating of the downscaled warped images comprising using a downscaled target disparity map of differences between pixel image data location on one of the downscaled first and second input images and a pixel location at a downscaled virtual view.

Further to the third implementation, the instructions cause the computing device to operate by computing a gradient value to be used in the gradient-based interpolation and hole filling equation to form the downscaled filled image, and the gradient value at least partly depending on image data values of warped images used to form the downscaled merged image and an interpolation weight when no image data is present at the pixel location on the downscaled merged image.

Further to the third implementation, the instructions cause the computing device to operate by refining the image data of the virtual view image comprising modifying the image data of the virtual view image so that a gradient map of the virtual view image matches a gradient map of the full resolution merged image.

In one or more fourth implementations, at least one machine readable medium includes a plurality of instructions that in response to being executed on a computing device, cause the computing device to perform a method according to any one of the above implementations.

In one or more fifth implementations, an apparatus may include means for performing a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A device for generating a virtual view image of a scene comprising:
    a memory to store first and second input images respectively corresponding to first and second view positions of the same scene; and
    a processor coupled to the memory, the processor being arranged to operate by:
        generating a merged image of a target virtual view between the first and second view positions and by merging warped images associated with the first and second input images; and
        filling holes on a virtual view image at the target virtual view generated by using the merged image and comprising solving an energy equation that compares (1) a difference between a final interpolated current pixel value and a final interpolated neighbor pixel value that are both unknowns in the equation and (2) a gradient generated by using image values of the warped images and at least one interpolation weight when no image data exists at a current pixel location on the merged image and corresponding to the final interpolated current pixel value being computed.

2. The device of claim 1 wherein the processor is arranged to operate by using the energy equation to place interpolated image data on the virtual view image when the merged image has image data at the current pixel location and wherein the gradient of the energy equation is generated differently compared to the gradient computed when the merged image does not have image data at the current pixel location.

3. The device of claim 1 wherein the processor is arranged to operate by generating one or more initial disparity maps that indicate the difference of pixel location of image data between the first and second input images; and forming the merged image comprising using confidence values that indicate the accuracy of at least one of the initial disparity maps.

4. The device of claim 3 wherein the confidence values indicate a difference between (1) image data at a pixel location on the first or second input image and (2) image data of the same pixel location on a reprojected first or second image formed by adding a disparity of the initial disparity maps to the image data of the first or second input image.

5. The device of claim 3 wherein the confidence value is used to determine whether a pixel location of the merged image should have the image value of one of the warped images, or no image data.

6. The device of claim 3 wherein a low confidence value provides the merged image with no image data at a pixel location even when one of the warped images has pixel image data of the pixel location that could be placed into the merged image.

7. The device of claim 3 wherein the confidence value is 0 for low confidence and 1 for high confidence.

8. The device of claim 3 wherein the processor is arranged to operate by generating the warped images comprising using a target disparity map of differences between pixel image data location on one of the first and second input images and a pixel location at the target virtual view.

9. The device of claim 8 wherein the target disparity map is formed by using the initial disparity maps.

10. The device of claim 1 wherein the energy equation has a gradient energy term that is at least partly based on Poisson image editing and is solved iteratively while minimizing the energy equation to compute the final interpolated current pixel value.

11. The device of claim 1 wherein the processor is arranged to operate by maintaining temporal coherence comprising generating one or more motion maps for the first and second input images indicating motion of image data from one frame to another frame along a video sequence wherein one of the frames is the first or second input image; modifying initial disparity maps indicating the difference between pixel location of image data between the first and second input images and modified depending on the motion maps; and using the initial disparity maps to form at least one of the warped images and confidence values that indicate accuracy of the initial disparity maps and used to form the merged image.

12. The device of claim 1 wherein the processor is arranged to operate by generating a full resolution merged image by using full resolution versions of the first and second images; generating a downscaled merged image by using downscaled versions of the first and second images and downscaled warped images; forming a downscaled virtual image by using the downscaled merged image and downscaled warped images and the energy equation; and using the image data of the downscaled virtual image to fill holes on a full resolution virtual image generated by using the full resolution merged image.

13. A computer implemented method of generating a virtual view image of a scene comprising:
    obtaining image data of first and second input images respectively corresponding to first and second view positions of the same scene;
    generating at least one initial disparity map that indicates a difference of pixel location of image data between the first and second input images;
    generating one or more confidence values that indicate accuracy of the initial disparity maps, wherein the confidence values indicate a difference between (1) image data at a pixel location on the first or second input image and (2) image data of the same pixel location on a reprojected first or second image formed by adding a disparity of the initial disparity maps to the image data of the first or second input image;

generating a merged image at a virtual view by using the confidence values; and generating the virtual view image at the virtual view by using the merged image.

14. The method of claim 13 wherein generating the merged image comprises leaving a pixel location on the merged image without an image data value depending on the confidence value.

15. The method of claim 13 comprising:

forming one or more target disparity maps that indicate a difference of pixel location of image data between either of the first and second input images and a virtual view position of the virtual view image, and formed by using the initial disparity maps;

warping the first and second input images to form first and second warped images by using the target disparity maps; and forming the merged image by using rules that use both the confidence values and image data of the warped images.

16. The method of claim 13 comprising generating interpolated image values for the virtual view image based on the merged image comprising iteratively minimizing an energy equation with a gradient energy term that uses a gradient value of a pixel location that is computed differently depending on whether or not the pixel location has image data on the merged image.

17. The method of claim 16 comprising computing the gradient value at least partly depending on image data values of warped images used to form the merged image and an interpolation weight when no image data is present at the pixel location on the merged image.

18. The method of claim 13 comprising:

generating a full resolution merged image by using full resolution versions of the first and second images;

generating a downscaled merged image by using downscaled versions of the first and second images and downscaled warped images used to form the merged image;

forming a downscaled virtual view image by using the downscaled merged image, downscaled warped images, and an energy equation; and using the image data of the downscaled virtual view image to fill holes on a full resolution virtual view image generated by using the full resolution merged image.

19. At least one non-transitory machine readable medium comprising a plurality of instructions that, in response to being executed on a computing device, cause the computing device to generate a virtual view image of a scene by:

obtaining one or more initial disparity maps indicating the difference of image data position between image data of first and second input images each having a different view of the scene and for both full resolution versions and downscaled versions of the input images;

generating a full resolution merged image by using the one or more full resolution disparity maps;

generating a downscaled merged image by using the downscaled disparity maps;

using a gradient-based interpolation and hole filling equation to form a downscaled virtual image by using image data of the merged image;

generating the virtual view image comprising using a gradient-based interpolation and hole filling equation and the full resolution merged image; and filling holes in the virtual view image comprising using image data associated with the downscaled virtual image rather than the full resolution merged image.

20. The medium of claim 19 wherein the instructions cause the computing device to operate by upscaling the downscaled virtual image to the full resolution before using the image data of the downscaled virtual image to fill the holes of the virtual view image.

21. The medium of claim 19 wherein the instructions cause the computing device to operate by respectively forming the full resolution and downscaled merged images comprising using pixel-level confidence values that indicate the accuracy of the initial disparity maps.

22. The medium of claim 19 wherein the instructions cause the computing device to operate by generating downscaled warped images to be merged to form the downscaled merged image, the generating of the downscaled warped images comprising using a downscaled target disparity map of differences between pixel image data location on one of the downscaled first and second input images and a pixel location at a downscaled virtual view.

23. The medium of claim 19 wherein the instructions cause the computing device to operate by computing a gradient value to be used in the gradient-based interpolation and hole filling equation to form the downscaled filled image, and the gradient value at least partly depending on image data values of warped images used to form the downscaled merged image and an interpolation weight when no image data is present at the pixel location on the downscaled merged image.

24. The medium of claim 19 wherein the instructions cause the computing device to operate by refining the image data of the virtual view image comprising modifying the image data of the virtual view image so that a gradient map of the virtual view image matches a gradient map of the full resolution merged image.

* * * * *